United States Patent
Harman

(10) Patent No.: US 10,902,710 B2
(45) Date of Patent: Jan. 26, 2021

(54) MIMO CABLE GUIDED INTRUSION DETECTION SENSOR

(71) Applicant: Fiber SenSys, LLC, Hillsboro, OR (US)

(72) Inventor: Robert Keith Harman, Almonte (CA)

(73) Assignee: Fiber SenSys, Inc., Hillsboro, OR (US)

(*) Notice: Subject to any disclaimer, the term of this patent is extended or adjusted under 35 U.S.C. 154(b) by 70 days.

(21) Appl. No.: 16/301,129

(22) PCT Filed: May 5, 2017

(86) PCT No.: PCT/CA2017/000113
§ 371 (c)(1),
(2) Date: Nov. 13, 2018

(87) PCT Pub. No.: WO2017/193201
PCT Pub. Date: Nov. 16, 2017

(65) Prior Publication Data
US 2019/0164400 A1    May 30, 2019

Related U.S. Application Data

(60) Provisional application No. 62/335,146, filed on May 12, 2016.

(51) Int. Cl.
G08B 13/26    (2006.01)
G08B 13/24    (2006.01)
(Continued)

(52) U.S. Cl.
CPC .......... *G08B 13/2497* (2013.01); *G01S 13/08* (2013.01); *G08B 13/2491* (2013.01);
(Continued)

(58) Field of Classification Search
CPC ................ G08B 13/26; G08B 13/2497; G08B 13/2494; G08B 13/2491; G08B 13/122; G08B 21/22
See application file for complete search history.

(56) References Cited

U.S. PATENT DOCUMENTS 4,091,367 A    5/1978  Harman
4,415,885 A    11/1983 Mongeon
(Continued)

FOREIGN PATENT DOCUMENTS

CA    1169939    6/1984
CA    1332185    9/1994
(Continued)

OTHER PUBLICATIONS

R.K. Harman, "Guidar: An Intrusion Detection System for Perimeter Protection," 1976 Carnahan Conference on Crime Countermeasures, May 1976, pp. 155-159, University of Kentucky, Lexington, Kentucky, USA.
(Continued)

*Primary Examiner* — Benyam Haile
(74) *Attorney, Agent, or Firm* — Ganz Pollard, LLC

(57) ABSTRACT

In at least one embodiment the present invention relates to a Multiple Input Multiple Output (MIMO) covert terrain following outdoor perimeter security sensor that can detect, locate and categorize intruders as they move in proximity to buried sensor cables. This MIMO cable guided radar utilizes parallel standard leaky coaxial cables with uniform aperture(s) in the outer conductor. RF transmissions from both ends of one cable setup an invisible electromagnetic detection field which couples into parallel receive cables. When an intruder moves within the coupled electromagnetic fields the amplitude and phase of the multiple received signals are altered. Signals received from both ends of each receive cable are processed jointly to detect and locate
(Continued)

intruders along the length of the sensor cables. The joint processing of the responses seen from both ends of the cable(s), referred to as End-to-End correlation provides uniform sensitivity along the length of cables without the need for expensive "graded" cables. With multiple receive cables the responses can in turn be used to classify the target in terms of direction, speed and size of the intruder crossing over the cables. The MIMO nature of the present invention can allow one to track intruders crossing the perimeter thereby reducing the number of nuisance and false alarms.

21 Claims, 9 Drawing Sheets

(51) Int. Cl.
  G01S 13/08 (2006.01)
  G08B 21/22 (2006.01)
  G08B 13/12 (2006.01)
(52) U.S. Cl.
  CPC ......... G08B 13/2494 (2013.01); G08B 13/26 (2013.01); G08B 13/122 (2013.01); G08B 21/22 (2013.01)

(56) References Cited

U.S. PATENT DOCUMENTS

| | | | |
|---|---|---|---|
| 4,562,428 A | 12/1985 | Harman et al. |
| 4,760,295 A | 7/1988 | Macalindin |
| 4,987,394 A | 1/1991 | Harman et al. |
| 4,994,789 A | 2/1991 | Harman |
| 5,068,642 A | 11/1991 | Hruby et al. |
| 5,446,446 A | 8/1995 | Harman |
| 5,448,222 A | 9/1995 | Harman |
| 5,914,655 A | 6/1999 | Clifton et al. |
| 6,252,507 B1 | 6/2001 | Gagnon |
| 6,271,754 B1 | 8/2001 | Durtler |
| 6,424,289 B2 | 7/2002 | Fukae et al. |
| 6,577,236 B2 | 6/2003 | Harman |
| 7,576,648 B2 | 8/2009 | Harman |
| 7,978,071 B2 | 7/2011 | Abeele et al. |
| 8,111,158 B2 | 2/2012 | Aizawa |
| 8,164,509 B1 | 4/2012 | Fullerton et al. |
| 8,179,149 B1 | 5/2012 | Holly |
| 8,421,622 B2 | 4/2013 | Tsujita et al. |
| 9,557,427 B2 | 1/2017 | Bendahan et al. |
| 2002/0041232 A1 | 4/2002 | Harman |
| 2008/0036597 A1* | 2/2008 | Harman ............... G01S 13/288 340/552 |
| 2008/0117043 A1 | 5/2008 | Van Den et al. |
| 2010/0244856 A1 | 9/2010 | Morita et al. |
| 2011/0163887 A1* | 7/2011 | Tsujita ................. G01S 7/354 340/686.6 |

FOREIGN PATENT DOCUMENTS

| | | |
|---|---|---|
| CA | 2144408 | 2/2002 |
| CA | 2901652 | 3/2007 |
| CA | 2802461 | 12/2011 |
| EP | 0272784 | 6/1988 |
| EP | 2078325 | 5/2013 |
| JP | 2011027666 | 2/2011 |

OTHER PUBLICATIONS

R.K. Harman, et al. "Advancements in Leaky Cable Technology for Intrusion Detection" 1982 Carnahan Conference on Security Technology, May 12-14, 1982, pp. 115-121, University of Kentucky, Lexington, Kentucky, USA.

R.K. Harman, "Sentrax—A Perimeter Security System," 1983 Conference on Crime Countermeasures and Security May 11-13, 1983, pp. 29-34, University of Kentucky, Lexington, Kentucky, USA.

R.K. Harman, "Burial Medium Effects on Leaky Coaxial Cable Sensors," 1983 International Carnahan Conference on Security Technology, Oct. 4-6, 1983, pp. 185-189, Zurich, Switzerland.

R.K. Harman, "Intrepid Microtrack Leaky Cable Sensor," Carnahan Conference on Security Technology, Oct. 20-24, 2002, pp. 191-197, 2002, Atlantic City, New Jersey, USA.

Lindseth, et al. "Leaky Cable Intrusion Detection Sensors," 1982 Carnahan Conference on Security Technology, May 14-16, 1986, pp. 57-63, University of Kentucky, Lexington, Kentucky, USA.

Keith Harman, et al., "The Next Generation of Guidar Technology," Carnahan Conference of Security Technology, Oct. 11-14, 2004, pp. 1-8, Albuquerque, New Mexico, USA.

J. Hong, et al, "Contra-Directional Coupling in Grating-Assisted Guided-Wave Devices," Journal of Lightwave Technology, Jul. 1992, pp. 873-881, vol. 10, issue 7, available from https://ieeexplore.ieee.org/abstract/document/144907.

International Search Report and Written Opinion for PCT Application No. PCT/CA2017/000113, dated Sep. 11, 2017, 10 pages.

Harman, "Outdoor Perimeter Security Sensor Innovation Past, Present, and Future," Carnahan Conference Security Technology, Oct. 2018, 48 pages, Canada.

Extended European Search Report for European Application No. 177952074, dated Dec. 6, 2019.

\* cited by examiner

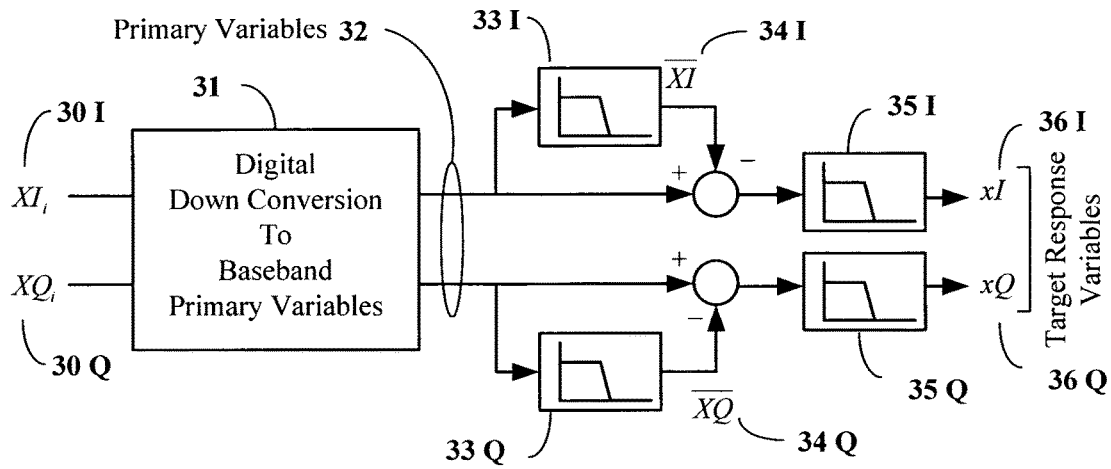

| Primary Variables $j=\sqrt{-1}$ | $\Rightarrow$ | Decimated Primary Variables | $\Rightarrow$ | Clutter Variables | $\Rightarrow$ | Primary Target Response Variables |
|---|---|---|---|---|---|---|
| $ULBI_i + j\,ULBQ_i$ | | $ULBI_k + j\,ULBQ_k$ | | $\overline{ULBI_k} + j\,\overline{ULBQ_k}$ | | $uLB_k = uLBI_k + j\,uLBQ_k$ |
| $ULCI_i + j\,ULCQ_i$ | | $ULCI_k + j\,ULCQ_k$ | | $\overline{ULCI_k} + j\,\overline{ULCQ_k}$ | | $uLC_k = uLCI_k + j\,uLCQ_k$ |
| $URBI_i + j\,URBQ_i$ | | $URBI_k + j\,URBQ_k$ | | $\overline{URBI_k} + j\,\overline{URBQ_k}$ | | $uRB_k = uRBI_k + j\,uRBQ_k$ |
| $URCI_i + j\,URCQ_i$ | | $URCI_k + j\,URCQ_k$ | | $\overline{URCI_k} + j\,\overline{URCQ_k}$ | | $uRC_k = uRCI_k + j\,uRCQ_k$ |
| $VLBI_i + j\,VLBQ_i$ | | $VLBI_k + j\,VLBQ_k$ | | $\overline{VLBI_k} + j\,\overline{VLBQ_k}$ | | $vLB_k = vLBI_k + j\,vLBQ_k$ |
| $VLCI_i + j\,VLCQ_i$ | | $VLCI_k + j\,VLCQ_k$ | | $\overline{VLCI_k} + j\,\overline{VLCQ_k}$ | | $vLC_k = vLCI_k + j\,vLCQ_k$ |
| $VRBI_i + j\,VRBQ_i$ | | $VRBI_k + j\,VRBQ_k$ | | $\overline{VRBI_k} + j\,\overline{VRBQ_k}$ | | $vRB_k = vRBI_k + j\,vRBQ_k$ |
| $VRCI_i + j\,VRCQ_i$ | | $VRCI_k + j\,VRCQ_k$ | | $\overline{VRCI_k} + j\,\overline{VRCQ_k}$ | | $vRC_k = vRCI_k + jvRCQ_k$ |

*FIG. 4*

MIMO CABLE GUIDED INTRUSION DETECTION SENSOR

FIELD

The present invention relates generally to systems and methods for the outdoor perimeter detection of intruders. More particularly the invention relates to the use of standard leaky coaxial cables buried in the ground to detect, locate and classify the nature of the intrusion in terms of direction and speed of entry as well as size of the intruder.

BACKGROUND

One of the earliest patents relating to leaky coaxial cable sensors is U.S. Pat. No. 4,091,367 issued May 23, 1978 entitled "Perimeter Surveillance System" invented by Robert Keith Harman, who is also the author of the present invention. It describes a parallel leaky coaxial cable sensor using an RF pulse transmission to detect and locate intruders on the perimeter. The transmitter and receiver are located at the same end of two parallel sensor cables in a "contra-directionally coupled" configuration. The size of the apertures in the custom made sensor cables increase with distance from the processor to compensate for cable attenuation in a process that is often referred to "cable grading". This custom cable design is expensive and leads to wastage since the cables are only available in specific lengths. A number of products based on this design have been developed and are used in many countries around the world. The leaky coaxial cables used in these products are also referred to as ported coaxial cables.

A Continuous Wave (CW) leaky coaxial cable sensor is described in U.S. Pat. No. 4,415,885 issued Nov. 15, 1983 entitled "Intrusion Detector" invented by Ronald W. Mongeon which describes both a two and three leaky coaxial cable sensor. The transmitter and receiver are located at opposite ends of the parallel sensor cables in a "co-directionally coupled" configuration. The use of co-directional coupling avoids the need for costly graded cables but does not include target location or target speed of crossing information.

With the advent of low cost microprocessors that could function in an outdoor environment, the distributed Continuous Wave (CW) sensor system described in U.S. Pat. No. 4,562,428 entitled "Intrusion Detector" was invented by Robert Keith Harman. As a contra-directionally coupled sensor it relies on "graded cable" to account for cable attenuation. It was the first leaky coaxial cable sensor to superimpose power and data over the sensor cables to facilitate the use of multiple processors around a perimeter with only one point of access to the perimeter. Similar power and data over leaky cable techniques are in wide spread use today.

More recently Ultra-Wide Band leaky coaxial cable sensors have been developed that detect and determine the location of the intruder along a length of contra-directionally coupled sensor cables. A sensor using FMCW modulation is described in the patent U.S. Pat. No. 6,577,236 entitled "FMCW Cable Guided Intrusion Detection Radar" invented by Robert Keith Harman. A sensor using a coded pulse transmission is described in the patent U.S. Pat. No. 7,576,648 entitled "Cable Guided Intrusion Detection Sensor, System and Method" also invented by Robert Keith Harman. The coded pulse is based on complementary Golay codes. In both cases wideband modulation is used to measure the time delay associated with the propagation from the processor to the intruder and back to the processor. This time delay is a measure of the location of the intruder along the length of the sensor cable. Such sensors are more complex than CW sensors and they are subject to RF interference from communication equipment operating in approved spectrum allocations.

The use of Ultra-Wideband modulation in the HF and VHF band of frequencies presents several radio regulatory problems. Every country requires that the RF emission levels be below strict limits to gain approval. This can lead to nuisance alarms caused by legitimate radio transmissions in these particular bands. By contrast most CW based sensors use a narrow bandwidth and operate in the internationally accepted Industrial, Scientific and Medical (ISM) band which is around 40.68 MHz. This allows for increased transmission levels and moreover radio communications are prohibited in this band.

Standard leaky coaxial cables with uniform aperture(s) in the outer conductor are manufactured in large quantities for use in communications in confined areas such as mines and tunnels. Most leaky coaxial cable sensors on the market today use expensive "graded" cables in which the apertures in the outer conductor increase in size along the length of the sensor cables to compensate for the attenuation in the cables. The process of manufacturing "graded" cables is inherently more costly than standard cables and there is considerable wastage in its use since it is made in standard lengths and then cut to length at site with the excess cable being discarded.

Most leaky coaxial cable sensors utilize two parallel cables and depend solely on the contra-directly coupled response from the cables. Such sensors are vulnerable to defeat by what may be described as the cancellation effect. If certain conditions apply relating to the relative size of the two targets and the distance between the two targets the two responses can cancel one another. In effect two knowledgeable people can cross over these sensors without being detected.

Multiple Input Multiple Output (MIMO) capabilities of the present invention provide improved performance in terms Probability of Detection (PD) of Nuisance and False Alarm Rates (NAR/FAR) using standard leaky coaxial cables. Simultaneously processing data received from both ends of the sensor cables provides more information on which to characterize the intruder in terms of location, direction and speed of crossing as well as target size. The use of Field Programmable Radio Frequency (FPRF) integrated circuits minimizes the hardware complexity while reducing cost and increasing reliability. These FPRF integrated circuits were developed for Software Defined Radio (SDR) applications. If desired, the frequency agility built into the SDR integrated circuits can be used to avoid any attempts to jam the equipment and to meet country specific radio regulations. In addition the same hardware and cables can be used at different frequencies so as to address different applications such as the protection of wall tops, among other arrangements that will be readily appreciated by the skilled person.

Moreover, leaky coaxial cable sensors can exhibit nuisance and false alarms when used in proximity to metallic fences. In North America many high security sites, such as prisons, have two parallel chain link fences around their perimeter. Leaky coaxial cables sensors are often installed in the medium between the fences to detect people moving between the fences. While such fences reduce the number of nuisance alarms by limiting the movement of people and animals between the fences they can generate nuisance alarms due to multipath reflections from the fences due to intermittent electrical connections in the fence fabric. Just as MIMO conventional radar is used to minimize the effects of multipath reflections the MIMO cable guided radar with its End-to-End correlation described herein minimizes the number of nuisance alarms due to multipath.

BRIEF SUMMARY

The present invention relates to a Multiple Input Multiple Output (MIMO) covert terrain following outdoor perimeter security sensor, system and method that can locate and classify intruders as they penetrate an invisible electromagnetic field surrounding and emitting from buried leaky coaxial cables. It is contemplated that the targets can be classified in terms of speed, direction of movement and size. While this added information is useful to the user of the sensor in terms of directing the appropriate response to an alarm, one of the most significant benefits comes from the reduced nuisance and false alarm rates that come from using the target characterization in the detection process.

The MIMO nature of at least one embodiment of the present invention can include the simultaneous use of both contra-directionally coupled and co-directionally coupled responses. In the contra-directionally coupled mode of operation the transmitter and receiver functions are at the same end of the cables. In the co-directionally coupled mode of operation the transmitter and receiver functions are at the opposite end of the cables. Contra-directionally coupled responses depend upon the reflected cross section of the target while co-directionally coupled responses depend upon the scattered cross section of the target. As in traditional radar, the contra-directionally coupled response provides a measure of target location based on the time delay in propagation to the target and back. In this case it is the distance along the length of the cables around corners and up and down hills. The End-to-End correlation of the contra-directionally coupled responses provide uniform sensitivity along the length of the cables using standard leaky coaxial cable in which there is uniform aperture(s) in the outer conductor. Since such standard cable is widely used for communications in mines and tunnels it is produced in large quantity making it is considerably less costly than "graded" coaxial cables used by others. Both contra-directionally coupled and co-directionally coupled responses can be used to classify the target.

As the MIMO name implies there are Multiple Inputs and Multiple Outputs. When there are three parallel buried cables transmit Cable A lies midway between receive Cables B and C. RF transmissions are time multiplexed between the ends of Cable A. These transmissions setup surface waves that propagate along the outside of Cable A. The surface wave propagates along the length of the cable essentially at the velocity of propagation of the signals inside Cable A. This surface wave couples into the adjacent Cables B and C. The forward coupling is referred to as the co-directional coupling and the backward coupling is referred to as the contra-directional coupling. When a target such as an intruder moves within the invisible electromagnetic fields surrounding the cables both the contra-directionally coupled and the co-directionally coupled responses are perturbed. The responses measured on Cables B and C are referred to as the Cable B and C responses respectively. The time delay between the onset of the transmitted signal and the reception of the contra-directionally coupled responses can provide a measure of target location. The relative timing of the Cable B and Cable C contra-directionally coupled and co-directionally coupled responses can provide target classification in terms of direction, speed of crossing and target size.

It is contemplated that the End-to-End correlation of responses from both ends of the cables can provide uniform sensitivity along the length of the sensor cables using standard leaky coaxial cables. These commercially available cables are manufactured in quantity in numerous countries around the world. They are available with jackets that are designed for cost effective direct burial using a cable plough.

Previous leaky coaxial cable sensors rely on one response which is either contra-directionally or co-directionally coupled responses, but not both. On the other hand, MIMO cable guided sensors provide multiple simultaneous images of the target including those related to contra-directional and co-directional coupled signals. In the contra-directional mode the size of the response is proportionate to the "reflected cross section" of the target much like in conventional radar. In the co-directional mode the size of the response is proportionate to the "scattered cross section" of the target much like in a bistatic radar where the target is on the boresight axis of the transmit and receive antennas.

It is contemplated that the End-to-End correlation of responses from both ends of Cables B and C can provide up to eight times the target information used in all existing leaky coaxial cable sensors. Partially processed data from the processor on one end of the cables is sent over the cables to the processor on the other end of the cables. In the Narrow-Band embodiment of the invention the data communications can be performed using frequency multiplexing of 10-Base-T Ethernet over the sensor cables. Leaky coaxial cables are very inefficient at coupling energy below about 10 MHz so minimal data is coupled out of the leaky cables. In this case filters can be used to isolate the data from the RF transmission. In the Wide-Band embodiment of the invention the RF transmission is based on a Pseudo Noise (PN) sequence generated by an m-stage Linear Feedback Shift Register (LFSR). A unique $M=2^m-1$ bit long PN sequence is generated with a starting point defined by an m-bit seed that is loaded into the shift register. The transmission is encoded with the message being sent from one processor to the next without the need for any additional equipment.

In the Narrow-Band embodiment of the invention the relative phase of the contra-directionally coupled responses at the two received frequencies can be processed to locate the intruder along the length of the sensor cables. The co-directionally coupled responses can be processed to reliably detect multiple intruders regardless of their relative location thereby overcoming a vulnerability of most existing leaky coaxial cable sensors. There are several advantages of operating in the ISM band at 40.68 MHz. This ISM band is recognized worldwide and since communications is prohibited in the band the prospect of RF interference is minimized. The FCC and other regulatory bodies typically permit 20 dB more signal level to be transmitted in this band relative to other VHF bands. Most importantly the FCC and other radio regulatory bodies explicitly permit the use of leaky coaxial cable sensors in this band.

In the Wide-Band embodiment of the invention pulse compression based on a message encoded phase modulated signals are alternately transmitted from each end of Cable A to establish the invisible electromagnetic fields around the cables. The contra-directionally coupled responses received on Cables B and C are processed to detect and locate targets along the length of the cables. End-to-End correlation of the contra-directionally coupled target responses seen from both end of Cables B and C can provide uniform sensitivity along the length of the sensor cables with a significant reduction in the numbers of nuisance and false alarms. The co-directionally coupled responses are processed to reliably detect multiple intruders regardless of their relative location thereby overcoming a vulnerability of most existing leaky coaxial cable sensors.

Country-specific radio regulations apply to whatever RF transmission is used. In the Narrow-Band embodiment of the invention the RF transmission can fit within the VHF Instrument Scientific and Medical (ISM) band. In the wide-band embodiment of the FCC have approved other wide band ported coaxial cable sensor use about 25 MHz, and 32.125 MHz and between 55 and 70 MHz. As will be appreciated by the skilled person, different frequency bands are available in different countries. In any case there is excellent rejection of small animal responses since a human target at these frequencies lies within the Rayleigh region in terms of their radar cross section.

At least one embodiment of the present invention can be implemented in a Field Programmable Radio Frequency (FPRF) integrated circuit such as the Lime Microsystems LMS7002m. Such ICs are used in Software Defined Radio (SDR) applications. These low cost ICs are designed to allow for ease of frequency diversity under software control. The LMS7002m IC can operate between 100 kHz and 3.8 GHz. The software control of the FPRF IC makes it relatively easy to customize the hardware for use in different countries, among other additional benefits that will be readily understood by the skilled person.

In the networked MIMO cable guided sensor, it is contemplated that power can be provided over Cables B and C. Split polarity power is applied to the center conductors of Cables B and C with the neutral being the grounded outer conductor. As with house wiring this has the advantage of maximizing the amount of power transferred over the cables while meeting local building codes that typically limit the voltage on buried cables. It also minimizes voltage drop along the outer conductor. It is contemplated that either AC or DC power can be used as there are pros and cons in each case. Power and data superimposed over the cables allow the system to operate with power and data being supplied at only one location on the perimeter.

All existing contra-directionally coupled, co-directionally coupled Ultra-Wideband, and CW, leaky coaxial cable sensors can suffer from nuisance alarms associated with targets moving outside the desired detection zone. These can be caused by intermittent contacts in nearby fences, from human and vehicular traffic moving nearby the sensor cables, by vegetation blowing in the detection zone and from the motion of water puddles in the detection zone. The target tracking associated with MIMO cable guided sensor using three cables addresses this problem. To create an alarm the target must physically penetrate the perimeter by moving an appreciable distance from one cable towards the other and none of the above sources of nuisance alarms include such physical motion. In addition the MIMO End-to-End correlation of the responses seen from both ends helps reject such multipath nuisance alarms in a similar manner as MIMO is used to reject multipath effects in conventional radar.

With three-cable operation it is contemplated that a two cable fall back mode of operation is provided should either cables B or C be damaged. For shorter lengths operation from a single end is yet another fail safe feature that is contemplated.

One of the benefits of processing both co-directionally coupled responses is the elimination of the "target cancellation" vulnerability associated with multiples targets on sensors that rely solely on contra-directional coupling. The co-directional response effectively provides the sum of the two targets while the contra-directional response for two targets at specific spacing's subtract.

The object of at least one embodiment of the invention is to provide a leaky coaxial cable sensor with improved performance in terms of the numbers of nuisance and false alarms with added features such as target location and classification using off the shelf cables. By processing eight times the data of all other leaky cable sensors classification in terms of direction and speed of crossing can also turn the system into a penetration sensor. The use of low cost SDR ICs and standard cables that can be installed using a cable plough makes the present invention very cost effective.

DESCRIPTION OF THE DRAWINGS

The present invention will be better understood in connection with the following Figures, in which:

FIG. 1 illustrates the basic elements of at least one embodiment of the MIMO three cable co-directional and contra-directional coupled processes for the detection and classification of intruders. Specifically, FIG. 1A illustrates left to right transmission while

FIG. 4 illustrates at least one embodiment of the digital down conversion process performed in each receiver, the estimation of clutter and then the removal of clutter to drive the primary response variables;

DETAILED DESCRIPTION OF THE EMBODIMENTS

Figure 1A:
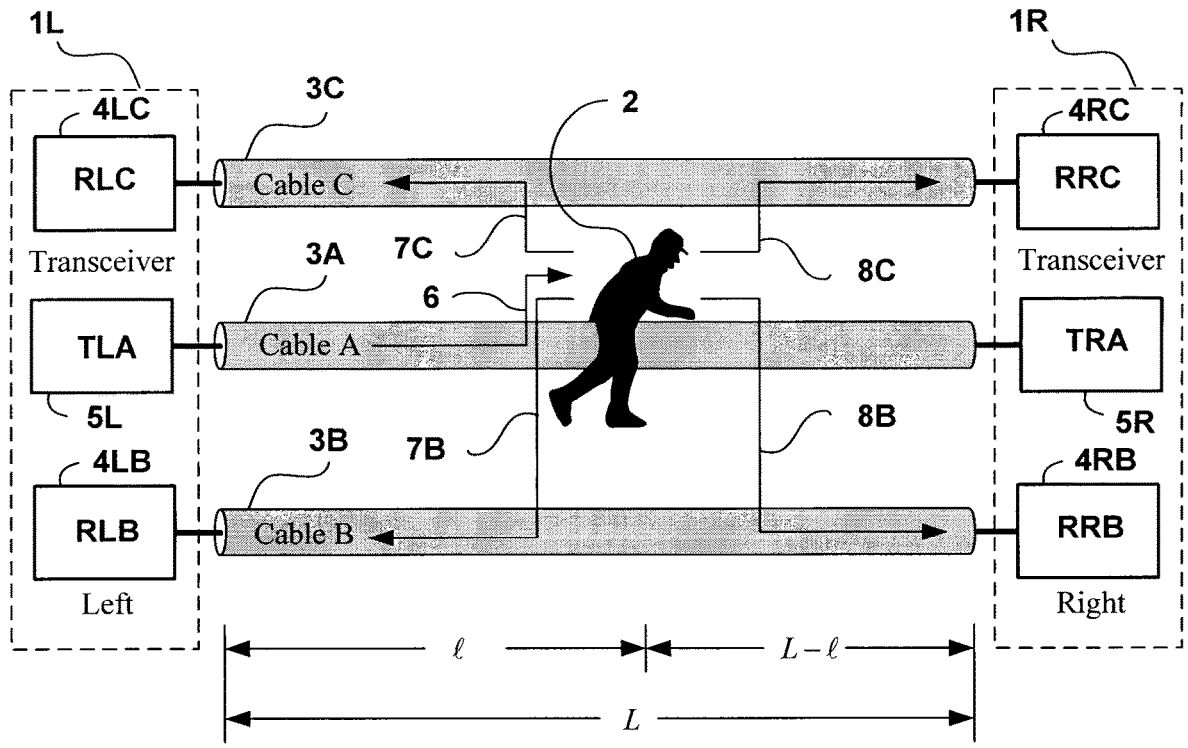

The present invention relates to a covert terrain following outdoor perimeter security sensor that can detect, locate and categorize intruders as they move in proximity to buried sensor cables. As illustrated in FIG. 1 the sensor utilizes three parallel leaky coaxial Cables; 3A, 3B and 3C with associated Transceiver Modules 1L and 1R at the Left and Right hand ends of the cables. Transceiver Module 1L includes Transmitter (TLA) 5L, Cable B Receiver (RLB) 4LB and Cable C Receiver (RLC) 4LC. Transceiver Module 1R includes Transmitter 5R, Cable B Receiver 4RB and Cable C Receiver 4RC. Transmitters 5L and 5R transmit VHF signals into the Left and Right hand ends of Cable 3A respectively. Receivers 4LB and 4LC process signals from the Left hand end of Cables 3B and 3C respectively. Receivers 4RB and 4RC process signals from the Right hand end of Cables 3B and 3C respectively.

Each processor can include two Transceiver Modules, 1L connected to the cables on the left and 1R connected to the cables on the right. In a system comprising only one processor Transceiver Modules 1L and 1R are two halves of the same processor. In a networked system comprising more than one processor Transceiver Modules 1L and 1R can be in the two processor modules at each end of the same cables.

It is contemplated that leaky coaxial cables 3A, 3B and 3C are fabricated with apertures in the outer conductor to allow RF energy to "leak" out of the cable. The preferred cable used in at least one embodiment of the present invention has a continuous slot in the outer conductor to allow RF energy to leak from the cable. These cables are widely used for communications in mines and tunnels. Sometimes these cables are referred to as ported coaxial cables. The "standard" leaky cables used in at least one embodiment of the present invention have a uniform slot width in the outer conductor along the length of the cables.

For clarity, it is contemplated that the aperture arrangement in cables suitable for use in connection with the present invention can take a variety of forms as will be readily appreciated by the skilled person. For example, it is contemplated that a suitable cable can have a single longitudinally extending aperture having a uniform width in the cable's outer conductor as discussed previously. Alternatively, it is contemplated that a suitable cable can have a plurality of aligned but separate apertures each having a uniform width, longitudinally oriented along the outer conductor of the cable, among other arrangement that will be readily appreciated by the skilled person.

The "leaked" energy creates an axially cylindrical surface wave that propagates along the outside of the cable as an open transmission line. This invisible electromagnetic field follows the cable around corners and up and down hills. As a surface wave structure, the field strength decays rapidly with radial distance from the cable as will be readily understood by the skilled person. The field decays as a Modified Bessel Function of the First Kind. The rapid radial decay of the electromagnetic fields ensures that detection zone is well contained. This allows for detection of intruders walking over the cables while not detecting large targets such as vehicles a few meters from the cables.

In FIG. 1A the VHF signal 6 generated by Transmitter (TLA) 5L propagating inside Cable 3A from left to right sets up an axially cylindrical surface wave that propagates from left to right outside of Cable 3A along the length of the cable. It couples RF energy into parallel receive Cables 3B and 3C as illustrated by arrows 7B, 7C, 8B and 8C. Coupled energy 7B and 7C sets up an axially cylindrical surface wave on receive Cables 3B and 3C propagating back towards Transceiver 1L. The coupling shown as 7B and 7C is referred to as the contra-directionally coupled signal since it propagates in the opposite direction to the transmitted signal 6. Coupled energy 8B and 8C sets up an axially cylindrical surface wave on receive Cables 3B and 3C propagating from left to right. The coupling shown as 8B and 8C is referred to as the co-directionally coupled signal since it propagates in the same direction as the transmitted signal 6.

Figure 1B:
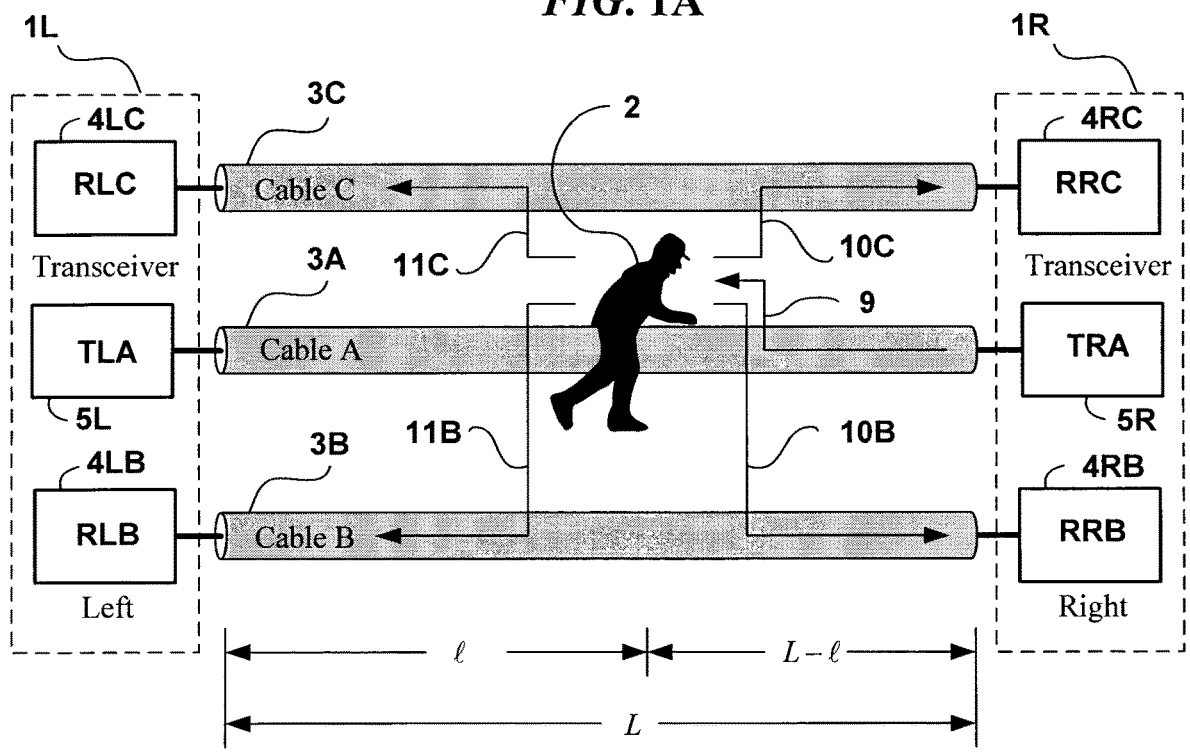
FIG. 1B illustrates right to left transmission.

In FIG. 1B the VHF signal 9 generated by Transmitter (TRA) 5R propagating inside Cable 3A from right to left sets up an axially cylindrical surface wave that propagates from right to left outside of Cable 3A along the length of the cable. It couples RF energy into parallel receive Cables 3B and 3C as illustrated by arrows 10B, 10C, 11B and 11C. Coupled energy 10B and 10C set up an axially cylindrical surface wave on receive Cables 3B and 3C propagating back towards Transceiver 1R. The coupling shown as 10B and 10C is referred to as the contra-directionally coupled signal since it propagates in the opposite direction to the transmitted signal 9. Coupled energy 11B and 11C sets up an axially cylindrical surface wave on receive Cables 3B and 3C propagating from right to left. The coupling shown as 11B and 11C is referred to as the co-directionally coupled signal since it propagates in the same direction as the transmitter signal 9.

Transmit signal 6 from Transmitter (TLA) 5L is time multiplexed with transmit signal 9 from TRA 5R. FIG. 1A illustrates the operation while TLA 6 is transmitting and FIG. 1B is while TRA 5R is transmitting. Intruder 2 is alternately illuminated by axially cylindrical surface wave 6 and 9.

The contra-directionally coupled signals 7B and 7C and the co-directionally coupled signals 8B and 8C are due to transmitted signal 6. The contra-directionally coupled signals 10B and 10C and the co-directionally coupled signals 11B and 11C are due to transmitted signal 9. When Intruder 2 is not present the coupled signals are referred to as the Clutter. This is directly analogous to the clutter caused by fixed objects in Moving Target Indicator (MTI) radar. In at least one embodiment of the present invention the co-directionally coupled clutter is approximately 20 dB larger than the contra-directionally coupled clutter.

When Intruder 2 enters the invisible detection zone both contra-directionally coupled signals 7B, 7C, 10B and 10C, and the co-directionally coupled signals 8B, 8C, 11B and 11C are perturbed. The changes in the contra-directionally coupled signals 7B, 7C, 10B and 10C are proportionate to the "reflected cross section" of Intruder 2. This is analogous to the reflected radar cross section of conventional radar. The changes in the co-directionally coupled signals 8B, 8C, 11B and 11C are proportionate to the "scattered cross section" of Intruder 2. This is analogous to the scattered cross section of bistatic radar with the target in the bore sight of transmit to receive antennas. In both cases the bigger the intruder is, the more the reflected signal. In the case of at least one embodiment of the present invention the contra-directionally coupled response is approximately equal in magnitude to the co-directional response.

Figure 2:
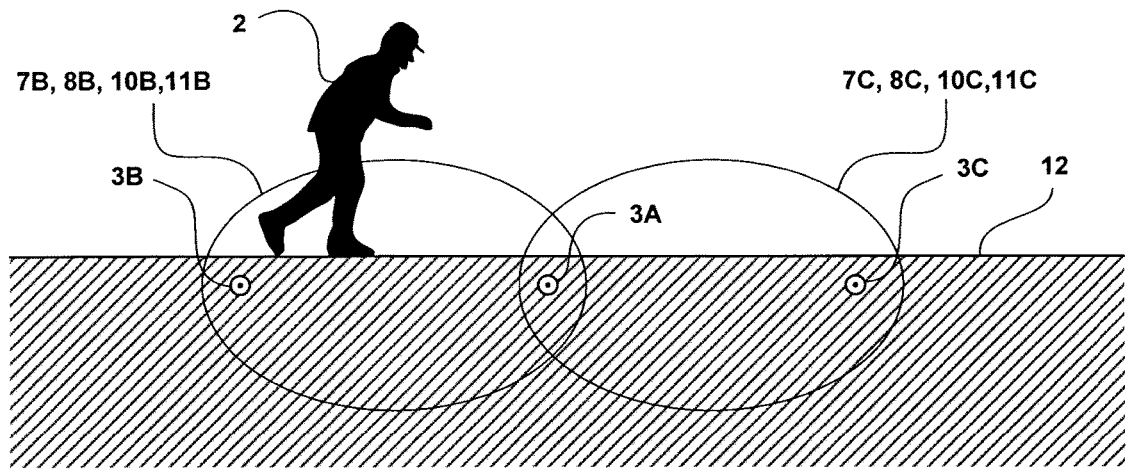
FIG. 2 illustrates at least one embodiment of the detection process in cross section with the intruder moving through the detection zones created by each pair of leaky coaxial cables.

FIG. 2 shows the detection zone in cross section. Cables 3B, 3A and 3C are typically buried 20 cm deep and 1.5 to 2 meters apart. The cables used in at least one embodiment of the present invention are designed for direct burial. They have two concentric jackets with a flooding compound between the layers. The flooding compound provides an element of "self-healing" should the outer jacket sustain a minor puncture. It is contemplated that direct burial cables can be installed using a cable plough. This can be a significant cost saving over the cost of trenching and back filling with sand as required by most other manufacturers, as will be readily understood by the skilled person.

The elliptical shape surrounding Cables 3A and 3B shown in FIG. 2 relate to the invisible detection zone created by the contra-directionally coupled and co-directionally coupled fields relating to 7B, 8B, 10B and 11B. The elliptical shape surrounding Cables 3A and 3C shown in FIG. 2 relate to the invisible detection zone created by the contra-directionally coupled and co-directionally coupled fields relating to 7C, 8C, 10C and 11C. The elliptical shape can be viewed as a contour of constant response for a point source target. When properly adjusted, the sensor will typically detect a person up to one meter above the ground or up to half a meter on either side of the cable pair. The detection zone width depends upon the cable spacing. The detection zone can extend into the ground somewhat as illustrated. It decays rapidly beyond Cables 3B and 3C. While shown as elliptical, the detection zones in FIG. 2 do in fact more closely resemble Ovals of Cassini as will be appreciated by the skilled person. This is due to the intersection of the two axially cylindrical surface waves. The coupling between the cables is altered as Intruder 2 moves into the detection zone.

Figure 3:
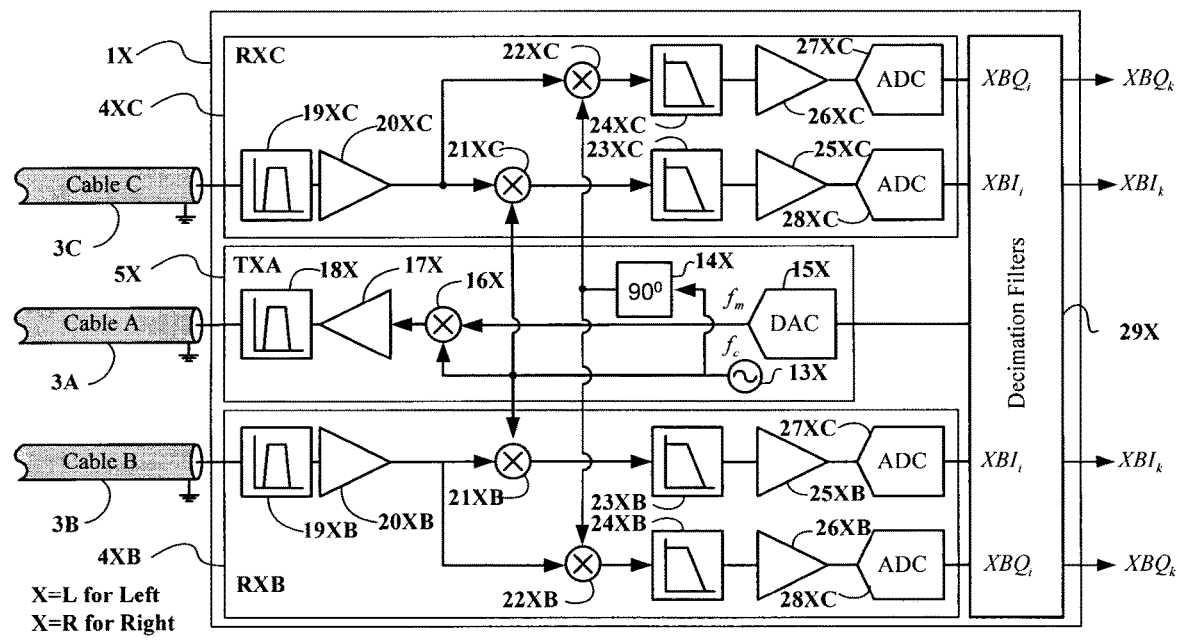
FIG. 3 presents a block diagram of the at least one embodiment of the analog, analog to digital and digital to analog components used in the detection process in each of the processor modules.

The MIMO is 2×2 (2 transmitters and 2 receivers) with transceiver 1L looking Left and transceiver 1R looking Right. Since the two transceivers are identical only one is illustrated in FIG. 3 with the symbol X representing L for Left and R for Right.

There is one transmitter section (TXA) 5X associated with each side of Processor 1X. Thermally compensated crystal controlled oscillator (TCXO) 13X supplies the carrier frequency $f_c$. Frequency stability is important due to the large clutter to target ratios in the contra-directionally coupled responses and even more important in the co-directionally coupled responses due to the even larger clutter to target ratio. In a closed loop application the left and right are the two ends of the same cable and the oscillator is common.

Carrier frequency 13X is mixed with a digitally generated modulation in mixer 16. The digitally generated modulation frequency, $f_m$, is converted using Digital to Analog Converter (DAC) 15X and applied to mixer 16X. The Software Defined Radio (SDR) nature of at least one embodiment of the present invention caters to different modulations for different applications. The present invention will be described in terms of;
1) a Narrow-Band embodiment based on a double sideband suppressed carrier transmission; and
2) a Wide-Band embodiment based on a Pseudo Random (PN) M-Sequence coded pulse transmission.

The two embodiments can differ in terms of the modulation and the associated Digital Signal Processing (DSP) of the response data however they share the same generic superheterodyne receiver structure.

The first step in the DSP is decimation of the digitized data performed in the decimation filter 29X. In FIG. 3 the input rate is denoted by subscript "i" and the output by subscript "k". The decimation factor is optimized for the application whether it be for Narrow-Band or Wide-Band embodiments of the invention.

The modulated RF signal is amplified in 17X and appropriately band pass filtered in 18X and applied to Cable 3A. It is contemplated that a power output of 20 to 30 dBm would be typical. The actual transmitted power into Cable 3A is under software control so that it can be easily adjusted to comply with the appropriate radio regulatory body.

The contra-directionally coupled RF responses received on Cables 3B and 3C are processed in two super heterodyne receivers as also shown in FIG. 3X. The received signals are appropriately band pass filtered in 19X and amplified in 20X. The output of amplifier 20X is applied to mixers 21X and 22X. Carrier frequency 13X and a quadrature version of 13X are also applied to mixers 21X and 22X respectively. When using a double sideband suppressed carrier transmission the mixing of the received RF with the carrier frequency generates the In-phase (I) Intermediate Frequency IF response and mixing the quadrature version of the carrier at the output of quadrature hybrid 14 generates the Quadrature phase (Q) Intermediate Frequency (IF) response. When transmitting a PN sequence modulated RF the mixing with the carrier generates both an I and Q response that is the composite of the contra-directionally coupled PN Sequence from along the cable length. The composite responses are correlated with PN Sequences delayed appropriately for each range bin along the length of the cables.

It is contemplated that the transmission is time multiplexed between looking left and looking right.

The I and Q responses measured by the transceiver while transmitting represents the contra-directionally coupled responses and those measured while the transmitter in the processor at the other end of the cables is transmitting represent the co-directionally couple responses. Both the contra-directionally coupled and co-directionally coupled responses are processed.

The 2×2 MIMO FPRF IC such as, but not limited to, the LMS7002M IC is contemplated to have all the components to perform all the functions shown in FIG. 3 on both the left and right ends of Cables B and C. As will be understood but the skilled person, the LMS7002M IC is capable of operation at frequencies from 100 kHz to 3.8 GHz, has two DACs which provide 12-bit conversion at 640 kS/s and four ADCs providing 12-bit conversion at 160 MS/s. An additional component that may be required in some embodiments is further RF amplification on the transmitted signals applied to Cable A. In these embodiments, the output level is software controlled in the IC. Moreover, it is contemplated that the oscillator 13 requires a clock reference. The reference clock should have a stability of ±1 parts per million (ppm) or better. This can become particularly important for processing the co-directional response with its large clutter.

It is contemplated that there are two transceivers 1L and 1R on the left and right end of the cables. Each transceiver generates four complex (I and Q) variables relating to co-directional coupling and contra-directionally coupling and Cables B and C. The complex outputs of the transceivers are referred to as the primary variables. There are eight primary complex phasor outputs from the generic process shown in FIG. 4. In labelling the phasors, I and Q represent the real and imaginary components, U and V describe co-directional and contra-directional phasors, L and R describe Left and Right end of the Cables and B and C describe Cable B and Cable C.

In FIG. 4 the decimated outputs of the transceivers shown in FIG. 3 are processed to derive the Target Response Variables. The down conversion to base band performed in 31 is specific to the type of modulation used. In the Narrow-Band embodiment the digitized IF responses are mixed with the CW modulation frequency to down convert the IF to base band. In the Wide-Band embodiment the same process is followed on a range bin by range bin basis.

The eight primary response variables derived by the generic process are presented in FIG. 4 along with the initial stages of the DSP including decimation and clutter removal to arrive at the target responses. The phasors are measured in rectangular coordinates expressed in terms of In-phase (I) and Quadrature-phase (Q) components which in polar coordinates relate to Magnitude (M) and Phase ($\phi$).

When using the LMS7002 IC the ADCs operate at 160 MS/s. Some of the decimation in 31 is performed in the TSP part of the LMS7002 and the balance in an FPGA connected to the LMS7002.

The decimated Primary Variables are low-pass filtered in 33 I and 33 Q. A corner frequency of 0.02 Hz is used in order to track environmental changes while passing the target responses. The clutter is subtracted from the Decimated Primary Variables and low-pass filtered in 35 I and 35 Q to arrive at the target responses 36 I and 36 Q. The corner frequency of the low-pass filters depends upon the type of modulation used in the transmission. The output of the processing described in FIG. 4 are the eight primary target response phasors listed in the table in FIG. 4.

In the generic system the complex Primary Response Variables provide eight independent views of the target. The four co-directional variables and four contra-directional variables depend on cable attenuation, cable velocity of propagation, target cross section and target location. The cable attenuation, $\alpha$, described in Nepers per meter (1 Neper=8.68 dB), is largely dependent on the copper losses in the conductor and the losses due to coupling through the apertures in the cable. The relative velocity in the cable, vr, largely depends on the permittivity of the cable dielectric and to some extent on the properties of the burial medium around the cable. The cable velocity, vc, expressed in meters per second is defined by vc=vr c where c=$3\times10^8$ m/sec the velocity of free space and vr=0.86. The phase factor, $\beta$, describing the propagation of the signals inside the cables is defined as $\beta=\omega/vc$ expressed in radians per meter where $\omega=2\pi f$ and f is the frequency of operation. With a target located l meters from the left end of the L meter long cables the eight primary response variables can be views as samples of the following analog signals where $j=\sqrt{-1}$.

$$uLB_k = MBXe^{-\alpha L}e^{-j\beta L} \quad (1)$$

$$uLC_k = MCXe^{-\alpha L}e^{-j\beta L} \quad (2)$$

$$uRB_k = MBXe^{-\alpha L}e^{-j\beta L} \quad (3)$$

$$uRC_k = MCXe^{-\alpha L}e^{-j\beta L} \quad (4)$$

$$vLB_k = MBe^{-2\alpha l}e^{-2j\beta l} \quad (5)$$

$$vLC_k = MCe^{-2\alpha l}e^{-2j\beta l} \quad (6)$$

$$vRB_k = MBe^{-2\alpha(L-l)}e^{-2j\beta(L-l)} \quad (7)$$

$$vRC_k = MCe^{-2\alpha(L-l)}e^{-2j\beta(L-l)} \quad (8)$$

The magnitude of the target based on its radar cross section is MBX and MCX for the scattered cross section response on Cables B and C respectively and the reflected cross section responses are MB and MC for Cables B and C respectively.

Previous leaky coaxial cable sensors rely on one, and only one, of these eight primary response variables. In contrast, at least one embodiment of the Narrow-Band embodiment of the present invention utilizes all eight primary variables. Moreover, in at least one embodiment of the Wide-Band embodiment of the present invention there are eight such variables for each range bin. In both the Narrow-Band and the Wide-Band embodiment of the invention data from one end of the cable is sent to the other end of the cable to implement End-to-End correlation. In small, closed perimeters where both ends of the cables connect to the same processor this communications is relatively simple and will be readily understood by the skilled person. In networked systems the data is communicated over the sensor cables from one processor to the next.

From equations (1), (2), (3) and (4) it will be apparent to the skilled person that the co-directional primary target responses are not a function of the target location and that they have uniform sensitivity along the length of the cables. Therefore, it is contemplated that sensors based on co-directional coupling and which use standard (non-graded) leaky cable are contemplated for use in connection with the present invention. Since there is no location information in the co-directional primary responses multiple simultaneous target responses will add, as will be readily understood by the skilled person.

From equations (5), (6), (7) and (8) it is apparent that the contra-directional responses decay exponentially with distance and the phase of the response increased linearly with distance along the cables. As a result, either phase change or time delay of contra-directional primary responses can be used to locate targets along the length of the cables. Since the phase of contra-directional primary responses depends on location it is possible that multiple simultaneous targets will cancel one another. This is a vulnerability of all contra-directionally coupled sensors. Moreover and as stated previously, sensors based on contra-directional coupling typically use "graded" leaky coaxial cables, where the apertures in these "graded" leaky coaxial cables increase in size with distance so that the increase in coupling compensates for the exponential decay due to attenuation. The grading is frequency dependent and there is typically wastage in the use of such cables since they are made in standard lengths.

It is contemplated that the eight primary variables can be combined to create eight secondary variables that can provide a number of useful features. The process of combining the response data from one end of the cable with that from the other end of the cable is referred to as End-to-End correlation. It involves taking the complex product of the responses measured at each end of the cables. Three co-directional secondary variables of particular interest are:

$$uB_k = uLB_k uRB_k^* = MBX^2 e^{-2\alpha L} \text{ Cable } B \text{ co-directional response} \quad (9)$$

$$uC_k = uLC_k uRC_k^* = MCX^2 e^{-2\alpha L} \text{ Cable } C \text{ co-directional response} \quad (10)$$

$$uA_k = uB_k uC_k^* = MBX^2 MCX^2 e^{-4\alpha L} \text{ Cable } A \text{ co-directional response} \quad (11)$$

The * symbol represent conjugation-negation of the imaginary term. The Cable B responses correspond to the ellipses 8B and 11B and ellipses 8C and 11C in FIG. 2. Cable A response is defined as the intersection of these ellipses shown in FIG. 2 that is localized over Cable 3A. Five contra-directional secondary variables of particular interest are:

$$vB_k = vLB_k vRB_k^* = MB^2 e^{-2\alpha L} e^{-j4\beta l} e^{j2\beta L} \text{ Cable } B \text{ response} \quad (12)$$

$$vC_k = vLC_k vRC_k^* = MB^2 e^{-2\alpha L} e^{-j4\beta l} e^{j2\beta L} \text{ Cable } C \text{ response} \quad (13)$$

$$vA_k = vLB_k vLB_k = MB^2 MC^2 e^{-4\alpha L} e^{-j8\beta l} e^{j4\beta L} \text{ Cable } A \text{ response} \quad (14)$$

$$vL_k = vLB_k vLC_k = MBMCe^{-4\alpha l} e^{-j4\beta l} \text{ Left side response} \quad (15)$$

$$vR_k = vRB_k vRC_k = MBMCe^{-4\alpha l} e^{-4\beta l} \text{ Right side response} \quad (16)$$

The magnitude of the Cable B and Cable C secondary variables shown in equations (12) and (13) do not depend on location 1 and the phase depends on 4βl. These provide uniform sensitivity along the length of the cables with standard leaky coaxial cables. Therefore, the Cable A secondary variable in equation (14) has uniform magnitude over the length of the cables and the phase depends on 8βl, which avoids the need for costly graded cables.

Equations (12), (13), (14), (15) and (16) can be thought of as End-to-End correlation of the responses seen from the left with the responses seen from the right. It is contemplated that the MIMO capability of the present invention makes this End-to-End correlation possible. As with MIMO radar this End-to-End correlation discriminates against multipath responses which in the case of leaky coaxial cable sensors can come from nearby fences, among other sources of multipath interference. As will be appreciated by the skilled person, multipath fence noise can be a significant problem with existing products.

Returning to FIG. 2 the cross sectional view of the detection zone is illustrated. The 0.02 to 4 Hz base band response corresponds to the intruder speed. An intruder stealthily moving at 0.07 m/s produces a response of approximately 0.02 Hz while a very fast intruder running at 7 m/s produces a response of approximately 4 Hz. Ultimately it is that very narrow base band response at 0.02 to 4 Hz that determines the Signal to Noise Ratio (SNR) that determines the Nuisance Alarm Rate (NAR) and False Alarm Rate (FAR). An alarm for which there is no visible cause is referred to as a False Alarm while an alarm caused by a visible target other than an adult human is referred to as a Nuisance Alarm. Hence an alarm caused by a very large dog or cow would be called a Nuisance Alarm.

An intruder crossing the cables will be detected first in the Cable B or Cable C response depending on the direction of crossing. Detection on one cable but not the other is referred to as an Event. It is contemplated that the time delay between being seen on the Cable B and C responses is a measure of the speed of crossing. The two elliptical detection zones 7B and 7C correspond to the contra-directionally coupled responses and the two elliptical detection zones, 8B and 8C correspond to the co-directionally coupled responses while transmitting from the left. The two elliptical detection zones 10B and 10C correspond to the contra-directionally couples responses and the two elliptical detection zones, 11B and 11C correspond to the co-directionally coupled responses while transmitting from the right. An intruder can create an Event and not an Alarm by approaching the cables and the walking back from the cables. Typically the system is set to generate an Alarm when the target penetrates the perimeter creating an Event on Cable B and then on Cable C or vice versa.

By declaring an Event when the target response first exceeds a threshold provides the user with the earliest possible indication that an Alarm may be forthcoming. The Event may be used to trigger CCTV assessment of the Event. By delaying the declaration of an Alarm until the target has actually moved from a Cable B to Cable C wide-allows the sensor to only declare an Alarm when the target actually has penetrated the perimeter. This dramatically reduces the number of nuisance and false alarms. Most sources of nuisance and false alarms with existing sensors will not actually cross over the sensor. In addition the operator can decide to only raise an Alarm when target 2 enters the perimeter or when target 2 leaves the perimeter. In addition by measuring the peak response while crossing the perimeter one can provide a measure of target size which is not available with existing sensors.

Should either Cable B or Cable C be cut, it is readily detected by the absence of co-directional response. In this case the sensor can automatically revert to two cable operation. In this fail safe mode targets continue to be detected but the classification in terms of direction and speed of crossing is inhibited. In some applications where target classification is not required the MIMO sensor can be used in this basic two cable configuration. The End-to-End correlation of response data from both ends of the cable still provides uniform sensitivity using standard cable.

It is contemplated that the basic attributes of the secondary variables pertain to both the Narrow-Band and Wide-Band embodiments of the invention. In the Wide-Band embodiment the primary and secondary variables defined previously exist for each range bin. The fundamental difference between Narrow-Band and Wide-Band embodiments of the invention lies in the nature of the transmitted signal.

Narrow-Band Embodiment

Returning to FIG. 3, the Narrow-Band embodiment of the present invention can utilize a double sideband suppressed carrier transmission within the ISM band at $f_c$=40.68 MHz and wherein the carrier is modulated with a frequency $f_m$=16 kHz. The lower sideband frequency is $f_1=f_c-f_m$ and the upper sideband frequency is $f_2=f_c+f_m$. The frequency of the modulating frequency is under software control. In a networked system, adjacent processors can use different modulation frequencies so as to avoid mutual interference between processors.

The digitally generated modulation signal driving mixer 16 is also used to time multiplex the transmission to the Left and to the Right such that the RF signal in Cable 3A propagates from left to right for half the time and from right to left for the remaining period of time. In a networked system, the time multiplexing of the Left and Right transmissions is synchronized so as to minimize the effects of mutual interference.

In the down conversion process, the modulation frequency becomes the Intermediate Frequency (IF) of a superheterodyne receiver. The IF is less than 20 kHz so that the transmission fits within the 40 kHz wide ISM band at 40.68 MHz. The retrieved modulation frequency is passed through antialiasing low pass filters 23B, 24B, 23C and 24C and passed to Analog to Digital Converters (ADC) 25B, 26B, 25C and 25C.

Figure 5:
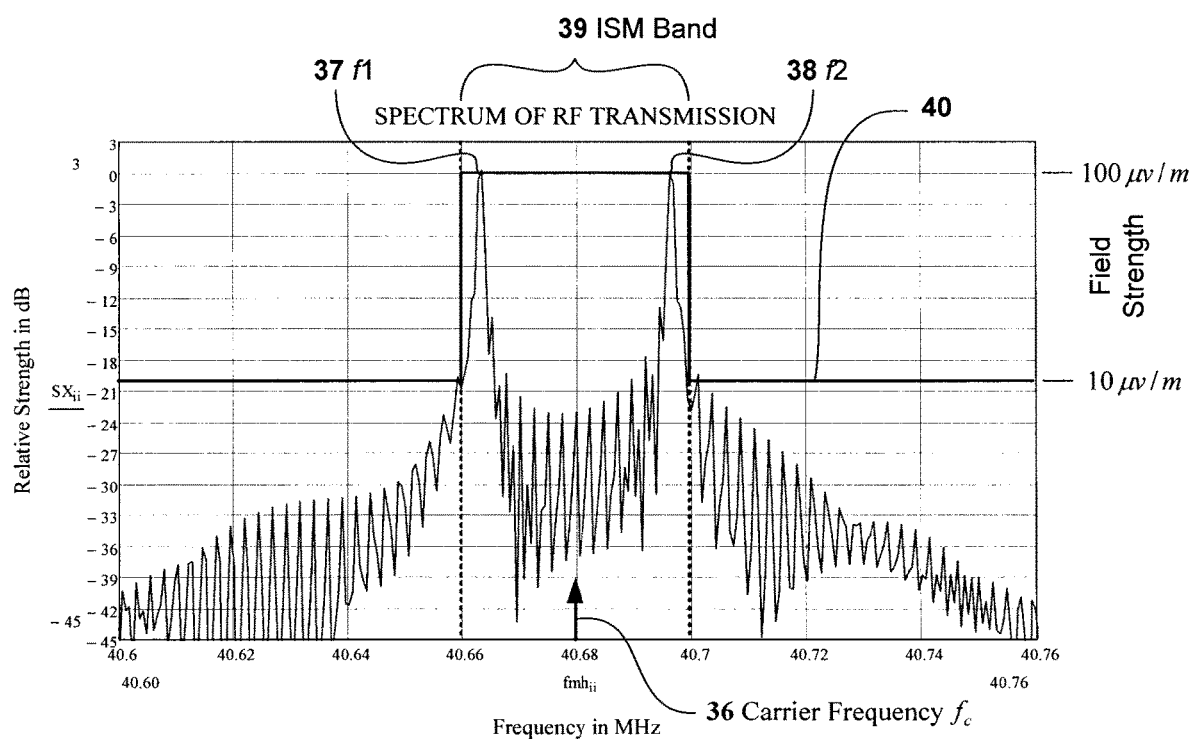
FIG. 5 illustrates at least one embodiment of the spectrum utilization of a double sideband suppressed carrier transmission associated with the Narrow-Band embodiment of the invention.

FIG. 5 illustrates the frequency spectrum of the double sideband suppressed carrier transmission that propagates along Cable 3A as an axially cylindrical surface wave. The carrier frequency 36 $f_c$ is at the center of the 40 kHz wide ISM Band 39. As shown the carrier frequency is suppressed in the transmission. The lower sideband is referred to as frequency $f_1$ 37 and the upper sideband as $f_2$ 38. The gains of transmit amplifier 17 on the left and right side are adjusted such that the field strength of the axially cylindrical surface wave measured at 30 meters radially from Cable 3A is less than the 100 μv/m 40 specified by the FCC. As will be appreciated by the skilled person, this ISM frequency band and the field strength limits are generally accepted by Radio Regulatory bodies worldwide and since RF communication is not permitted in the ISM band the potential of RF interference is minimized.

The down conversion 31 in FIG. 4 is performed using Radix-2 complex Fast Fourier Transforms (FFT) with 512 points. There are two outputs of interest from each Complex FFT; one related to the positive IF generated at frequency $f_1$ and one related to the negative IF generated by frequency $f_2$. These represent the contra-directional outputs; $VRC1_k$, $VRC2_k$, $VRB1_k$ and $VRB2_k$ where the "1" and "2" relate to the lower sideband frequency $f_1$ and the upper sideband frequency $f_2$. The same result can be obtained by replacing each Complex FFT with a Goertzel filter to minimize the computational burden. For a given carrier frequency of 40.68 MHz and an IF frequency of 16 kHz f=40.664 Hz and $f_2$=40.696 MHz.

There are eight secondary parameters as described in equations (9), (10), (11), (12), (13), (14), (15) and (16) for each frequency $f_1$ and $f_2$. The phase factors associated with $f_1$ and $f_2$ are $\beta_1$ and $\beta_2$ respectively. Strictly speaking there are two attenuations and two radar cross sections associated with the two frequencies as well, but since the two frequencies are so close together they can be assumed to have the same attenuation and same radar cross section. The eight secondary parameters for the two frequencies are denoted by adding a subscript "1" and "2" similar as used with the two frequencies.

The phase factor for frequencies $f_1$ and $f_2$ are $$\beta_1 = \frac{2\pi f_1}{v} = 1.05212$$

radians/meter and $$\beta_2 = \frac{2\pi f_2}{v} = 1.05304$$

radians/meter and the phase factor for the difference frequency is: $\beta_2 - \beta_1 = 0.0009241$ radians/meter which is 0.0529 degrees/meter.

The secondary variables defined by equations (12), (13) and (14) for frequencies $f_1$ and $f_2$ can be used to define location variables:

$$vB\Delta_k = vB_{2,k}vB_{1,k}^* = MB^4 e^{-4\alpha L} e^{-4j(\beta_2-\beta_1)l} \text{ Cable } B \text{ response} \quad (17)$$

$$vC\Delta_k = vC_{2,k}vC_{1,k}^* = MC^4 e^{-4\alpha L} e^{-4j(\beta_2-\beta_1)l} \text{ Cable } C \text{ response} \quad (18)$$

$$vA\Delta_k = MB^4 MC^4 e^{-8\alpha L} e^{-8j(\beta_2-\beta_1)l} e^{4j(\beta_2-\beta_1)L} \text{ Cable } A \text{ response} \quad (19)$$

The phase angle of the difference responses provides an unambiguous measure of location of a single target on the Cable A response over a range of 850 meters. A location accuracy of approximately 20 meters has been achieved using this approach. This approach to location is limited to one target at a time.

Equations (15) and (16) represent the responses as seen from each end of the cables as such the response magnitude attenuated exponentially from each end of the cables. Hence when there are two simultaneous targets equation (15) sees the target on the left much larger than the target on the right and equation (16) sees the target on the right much larger than the target on the left. To detect two simultaneous targets the following Left and Right incremental responses can be used.

$$vL\Delta_k = vL_{2,k}vL_{1,k}^* = MB^2 MC^2 e^{-4\alpha l} e^{-4j(\beta_2-\beta_1)l} e^{2j(\beta_2-\beta_1)L} \quad (20)$$

$$vR\Delta_k = vR_{2,k}vR_{1,k}^* = MB^2 MC^2 e^{-4\alpha(L-l)} e^{-4j(\beta_2-\beta_1)(L-l)} e^{2j(\beta_2-\beta_1)L} \quad (20)$$

In this way the system locates two simultaneous targets but in doing so is unable to classify targets in terms of direction and speed of crossing. If one needs to detect and accurately locate more than two simultaneous targets one should consider using the Wide-Band embodiment of the present invention.

In addition to equations (17), (18) and (19) it should be noted that the location of a single target can also be estimated using the ratio $vL\Delta_k/vR\Delta_k$.

In the Narrow-Band embodiment of the present invention data communication between processors is done using frequency multiplexing on the sensor cables. 10 Base-T Ethernet can be used with each processor having a unique IP address.

In summary the Narrow-Band embodiment of the invention operates inside the 40 kHz wide ISM band at 40.68 MHz where radio communications are prohibited thereby minimizing the potential of RF interference. Data communication is frequency multiplexed over the sensor cables.

Wide-Band Embodiment

Returning to FIG. 3, it is contemplated that the Wide-Band embodiment of the present invention utilizes a Pseudo Noise (PN) coded transmission. While other spreading codes could be used, the simplicity of generating a pseudo random noise sequence using a Linear Feedback Shift Register (LFSR) to create a maximal length code (M-Sequence) makes this well-known approach attractive for this application. An m stage LFSR generates a PN sequence that repeats after $M=2^m-1$ bits. To start the LFSR one loads the register with an m-bit word called the seed. The LFSR generates all possible m-bit numbers with the exception of an all zero word. The order in which it generates the m-bit numbers is determined by the feedback paths used by the LFSR. There are many different feedback possible feedback settings that generate a PN sequence. They are determined by a Primitive Polynomial.

The PN sequence of 1's and 0's is converted into a sequence of +1's and −1's that are used to modulate the RF carrier frequency using Binary Phase Shift Keying (BPFK). For a +1 the output is in-phase with the carrier and for a −1 the output is inverted in phase relative to the carrier (out-of-phase). This has the effect of spreading the transmitted spectrum. The duration of each +1 and −1 is referred to as the chip length. The bandwidth occupied by the spread spectrum is inversely proportional to the chip length.

Figure 6:
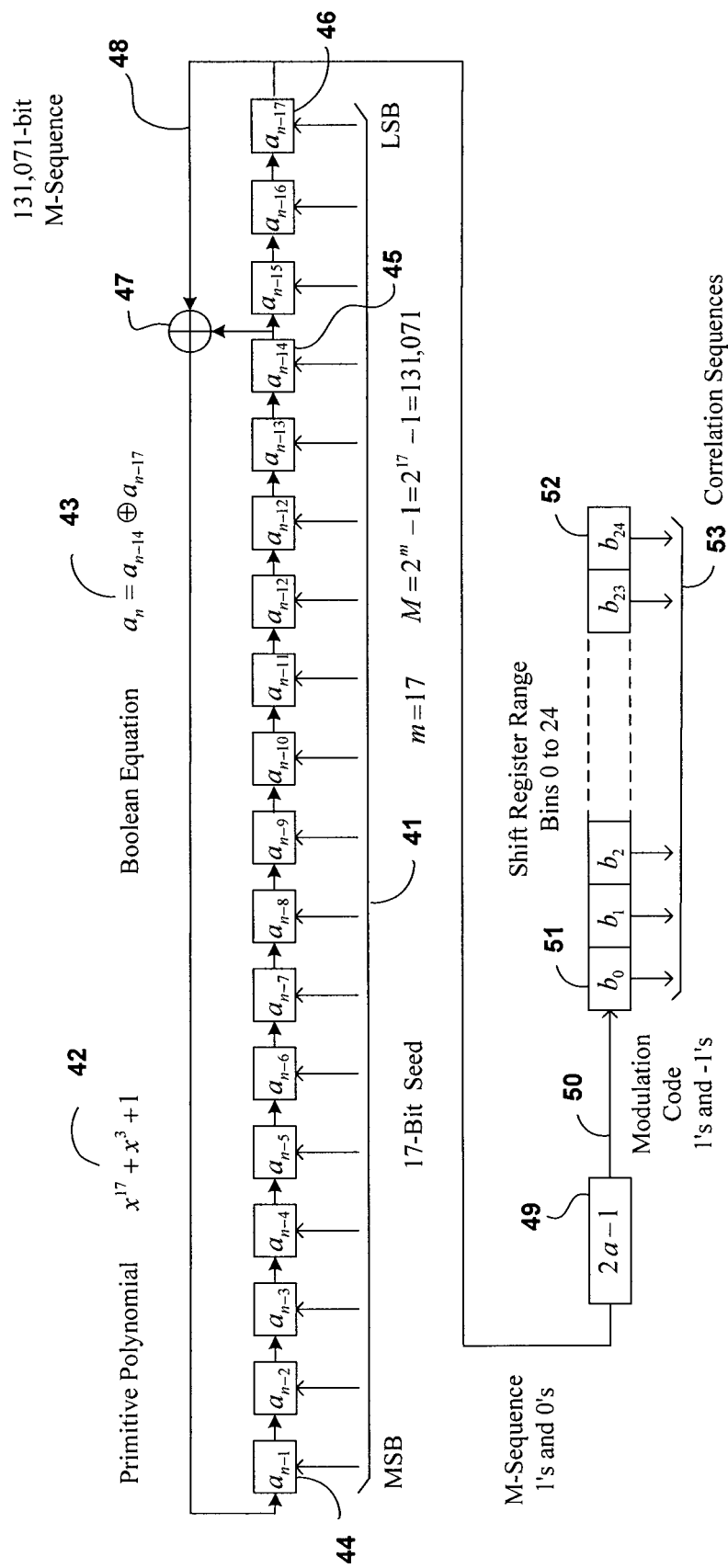
FIG. 6 illustrates at least one embodiment of how the Pseudo Noise (PN) spreading sequence is generated using a Linear Feedback Shift Register (LFSR) associated with the Wide-Band embodiment of the invention.

In one embodiment of the Wide-Band Sensor the PN coded transmission is generated using the m=17 stage LFSR shown in FIG. 6. The seventeen stages are labelled, $a_{n-1}$ 44 to $a_{n-14}$ 45 and $a_{n-17}$ 46. Feedback is provided from $a_{n-14}$ 45 and $a_{n-17}$ 46 using the "Exclusive OR" function 47. As will be appreciated by the skilled person this is only 1 of 7,710 possible feedback possibilities available with a 17-stage LFSR. The feedback shift register is defined by the Primitive Polynomial 42 and can be implemented by Boolean equation 43 where ⊕ represents an Exclusive OR function. The PN Sequence of 1's and 0's is periodic in that it repeats after 131,071 bits.

The 1's and 0's are converted to +1's and −1's using function 49. This sequence is passed through a shift register to generate twenty five different sequences labelled $b_0$ 51 through $b_{24}$ 52. The twenty five correlation sequences 53 are used in the periodic autocorrelation process to derive the 8 primary response variables for each of the twenty five range bins.

Figure 7:
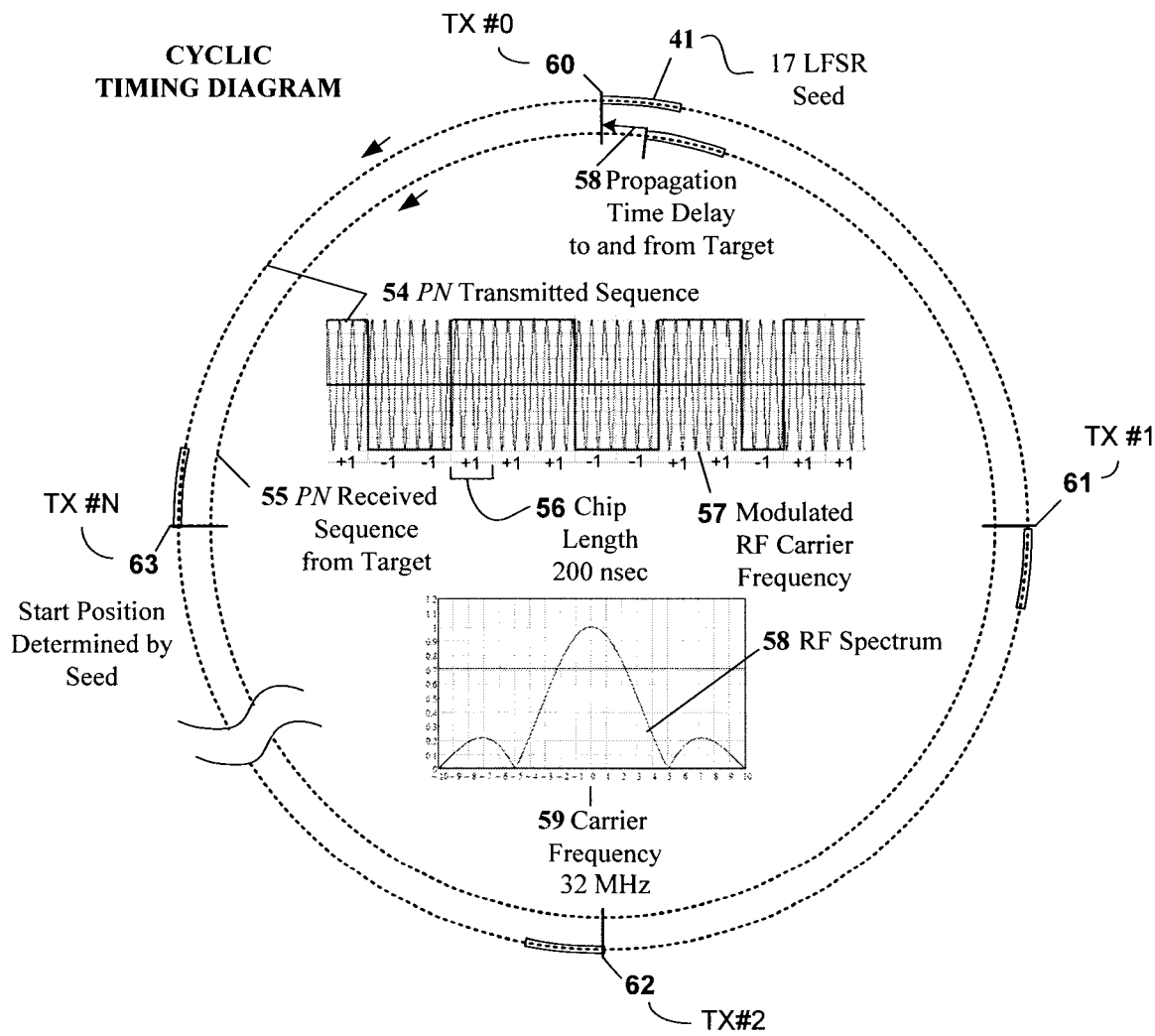
FIG. 7 illustrates the PN sequence in a cyclic drawing that provides insight into how the same sequence, but with different seeds for each transmission, minimizes the likelihood of mutual interference with the Wide-Band embodiment of the invention.

The cyclic diagram presented in FIG. 7 provides further insight into the use of the PN Sequence as it is applied in the Wide-Band embodiment of the present invention. Outer ring 54 represents the Transmitted PN sequence. It starts with the 17-bit Seed 41 loaded into the LFSR relating to transmitter TX #0 at the top of the diagram. As shown the PN Sequence rotates counter clockwise around the circle to repeat when it arrives back to the starting position after 131,071 chips. The inner ring 55 represents the PN Sequence reflected from the target and it also rotates counter clockwise around the circle but it is delayed from the Transmit PN Sequence 54 by the propagation delay 58 which is the time taken by the transmission to propagate from the transmitter to the target and back to the receiver. A segment of the RF transmission 57 illustrates how the +1 and −1 elements in the sequence are used to modulate the carrier frequency for each chip 56. A +1 element means that the RF in that chip is in-phase with the carrier frequency 59 and a −1 means that the RF in that chip is out-of-phase with the carrier. As will be appreciated by the skilled person, while the PN Sequence is called pseudo noise it is not random. For each feedback taps selected in the LFSR the sequence of +1 and −1 elements is deterministic. In networked systems all processors use the same LFSR feedback taps and hence generate precisely the same PN Transmit Sequence. The spectrum 58 of the RF transmission 57 has the shape of the absolute value of a sine(x)/x distribution. For a 32 MHz carrier and a 200 nanosecond chip the 3 dB bandwidth is about 4.4 MHz. The RF bandwidth is inversely proportional to the chip width. As in conventional radar, target resolution, the minimum distance between two targets for which two targets are both detected depends on the chip width.

As illustrated in FIG. 1 the RF transmissions are time multiplexed between the Left and Right transmitters 5L and 5R. In a short perimeter these may be the Left and Right sides of the same processor while in a larger networked system 5L and 5R are the Left and Right sides of adjacent processors around the perimeter. In networked systems the Left/Right time multiplexing is synchronized with all looking left at the same time and all looking right at the same time.

In a networked system it is contemplated that the RF transmission from one processor can propagate over the processor to enter the same side of the next processor. Indeed in some sites the RF transmission can propagate along nearby fences to enter virtually any another processor on the perimeter. In order to prevent such mutual interference from creating nuisance and false alarms each transmitter in the system is given a unique seed. In FIG. 7 seed 60 is shown at the top center of the cyclic diagram representing TX #0. Relative to Transmitter TX #1 is given unique seed 61. Seed 61 is selected such that it is many chips (say 1000 chips) around the circle meaning that the propagation from TX #1 will never coincide with TX #0. With a chip length of 200 nanoseconds a delay of 1000 chips would represent 0.2 milliseconds. This means that assuming free space propagation that the second processor would need to be 600 km away and it would be so attenuated as to not be a problem. TX #2 has another unique seed 62 that is further delayed around the cyclic diagram. With a sequence length of 131,071 there couple be up 131 unique transmit seeds which would relate to sixty five processors around the perimeter which is well beyond the practical limits imposed by cable attenuation. In FIG. 7 TX #N has seed 63. Returning to FIG. 6 PN correlation sequences 53 are the PN Sequence delayed by one chip per range bin. The Wide-Band embodiment has twenty five range bins. With a 200 nanosecond chip length and an 86% velocity of propagation inside the cables each range bin is 25.8 meters long. Hence twenty five range bins would relate to a cable length of 645 meters. The maximum cable length depends on the attenuation in the cables which for the present design is around 500 meters. This means that there are more than five extra range bins. This allows for extra range bins beyond each end of the cables. These extra range bins allow one to pinpoint the target location within each range bin by interpolating the responses in adjacent range bins.

The PN Sequence that is transmitted is one complete cycle (131,071 chips) plus the first 4,097 chips of the second cycle. The first 4,097 chips of the second cycle are used to ensure that the autocorrelation for each of the twenty five range bins is periodic and then a portion of the remaining chips are used to communicate from one processor to the next using Binary Phase Shift Keying (BPSK) modulation of the remaining PN Sequence.

The periodic autocorrelation of the I and Q contra-directionally coupled responses with the PN Reference Sequences generated for each range bin using the shift register shown in FIG. 6. The first range bin uses sequence $b_0$ 51 and the twenty fifth range bin uses sequence $b_{24}$ 52. There is one chip time delay between each of the range bin sequences. The periodic autocorrelation is computed as the sum of the received chip times the PN Reference Sequence chip for all 131,071 chips. For a constant level input of R the signals accumulate to produce an output of 131,071 times R. When the target is not in the range bin the sum is −R. As a result, there is a peak to side lobe ratio of 131,071 which corresponds to 102.4 dBs. It should be noted that while the autocorrelation functions in theory takes the product of the PN return sequence and that of the range bin reference sequence the product of +1 and −1 is simply adding and subtracting the received value to an accumulator for each range bin. The accumulators need to have sufficient number of bits to accommodate 131,071 times the sample value R.

Figure 8:
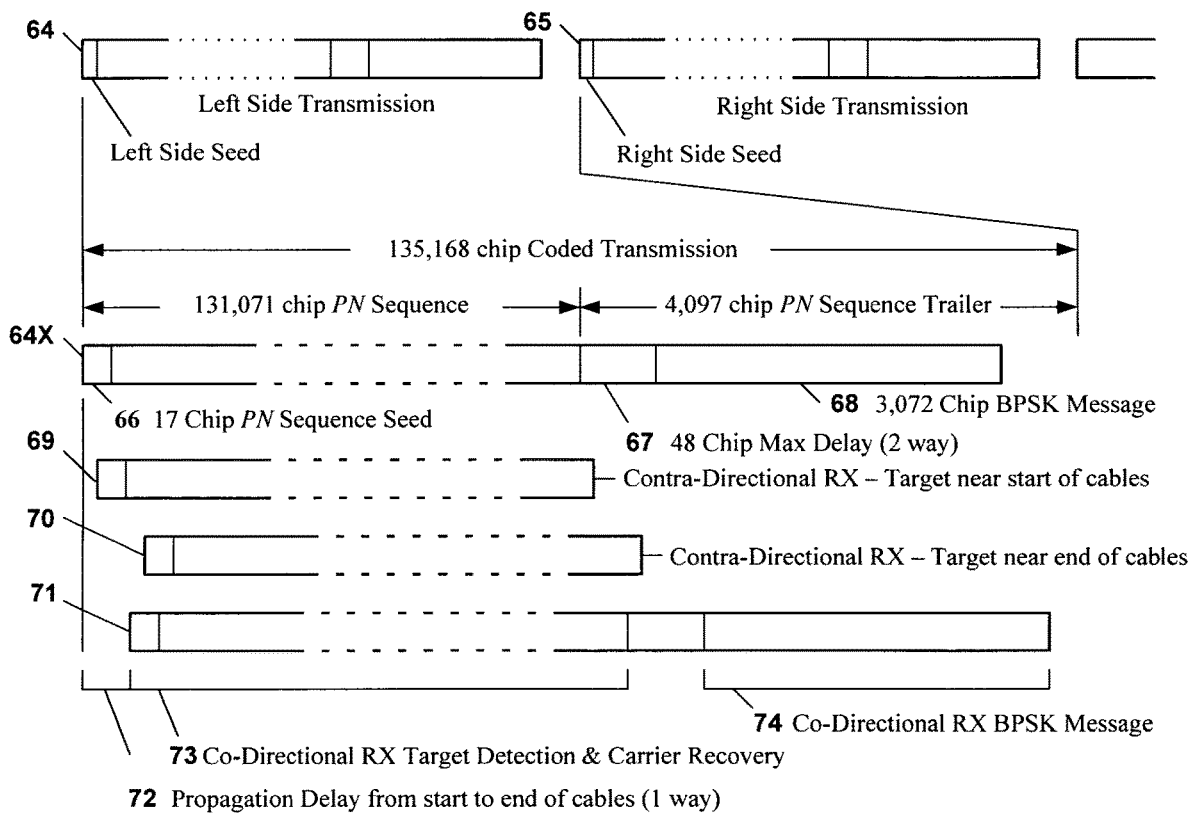
FIG. 8 illustrates at least one embodiment of the relative timing of the transmitted and received signals and their utilization for detection and communications in a Wide-Band embodiment of the invention.

The timing of the Left 64 and Right 65 transmissions is illustrated in FIG. 8. The complete coded transmission lasts 135,168 chips to the Left 64 and 135,168 chips to the Right 65. The content of each transmission is shown in the expanded view of the Left transmission 64X. It starts with the 17 chip seed 66 which is unique to each transmitter in a networked system as explained previously. The first cycle of the PN Sequence lasts for 131,071 chips. The first 48 chips 67 of the second cycle continue as defined by the sequence. This allows time for the signal to propagate to the end of the cables and back. This is followed by the 3,072 chips of communications data 68. The message that is being sent is used to modulate the PN Sequence using Binary Phase Shift Keying (BPSK).

The contra-directionally coupled reflections from two targets 69 and 70 are shown in FIG. 8. Target 69 is in the first half of the cable length and target 70 is in the second half of the cable length as indicated by their delay in time. While it is convenient to consider only two reflections to explain the process there is in fact a reflection from all twenty five range bins and they are all superimposed upon each other. The I and Q responses for the refection associated with each range bin appear at the output of each of the range bin correlators. These include clutter and target information. The target information is extracted using digital high pass filters associated with each range bin in a similar manner as described in connection with the Narrow-Band System using FIG. 4. In effect, each range bin can be thought of as a separate Narrow-Band system.

With the transmission on the Left there will be co-directionally coupled signal arriving at the right hand side of the processor on the left. This co-directionally coupled response is shown as 70 in FIG. 8. It is delayed from the transmitted signal 64 by the propagation time between the transmitting processor and the receiving processor as indicated by 71. The first 131,071 chips of the received co-directionally coupled response 72 is used to derive the co-directionally coupled target response and to provide carrier recovery. The BPSK message 73 is decoded at the processor to the left. Note that the receiving processor uses the seed of the transmitting processor to be able to observe the co-directional response. When a networked system is installed the appropriate seeds are stored into the neighboring processors to enable them to receive the co-directional response.

In a networked multi-processor system each processor when looking left uses its assigned seed to start the transmit LFSR. At the same time it uses another LFSR to receive the co-directional response from the processor on the right. In doing so it must use the seed associated with the left side transmitter of the neighboring processor. When each processor is looking right its assigned seed to start the transmit LFSR. At the same time it uses another LFSR to receive the co-directional response from the processor on the left. In doing so it must use the seed associated with the right side transmitter of the neighboring processor.

In CDMA communications using BPSK the receiving device must be able to recover the carrier frequency of the transmitter. The carrier frequency is usually recovered using a Costa Loop. The digital processor inside the LMS7002m is equipped with the necessary Numerically Controlled Oscillators (NCO) and complex mixers required to form a Costa Loop. In the Wide-Band implementation of the present invention the Q component of the co-directionally coupled responses of the first cycle 72 is used as the "error" signal to tune the NCO to modify the effective carrier frequency to recover the carrier frequency of the transmitting processor. In effect the Q response is adjusted to keep it close to zero thereby ensuring that the two processors share a common carrier frequency. The NCOs in the LMS7002m can adjust to a small fraction of a Hertz thereby ensuring that the carrier frequency is accurately locked. The I component measures the amplitude of the co-directionally coupled response. By recovering the carrier frequency of the transmitting processor and knowing the seed associated with the transmitting processor the BPSK message is easily retrieved.

Even though very accurate and very stable crystal oscillators are used in every processor, one must expect that they will differ slightly in frequency. The carrier recovery just described is used to synchronize the processor on the left with the processor on the right. The NCO with complex mixer inside the LMS7002m adjusts the local carrier frequency to lock to the processor on the left using the co-directionally coupled signal. In a networked system this allows all processors to share the carrier frequency of processor "0".

The periodic autocorrelation described previously provides 102.4 dB of peak to side lobe rejection because they share the same carrier frequency. By locking all of the processors to one carrier frequency any mutual interference is likewise suppressed by 102.4 dB. This will effectively eliminate the effects of mutual interference on networked systems thereby overcoming a common source of nuisance alarms on some existing ported coaxial cable sensors as discussed previously.

Third party RF interference mixes with the PN Sequence and its spectrum is spread thereby minimizing the effects of third party RF interference, which is a fundamental property of CDMA communications systems. The use of PN sequences with BPSK modulation involving carrier recovery is in common use today and the components in the LMS7002m are designed to implement such a communication system. However, the present invention contemplates the use of co-directionally coupled responses to lock the carrier frequency of all processors in the presently described MIMO Cable Guided Radar.

If so desired, in some embodiments a directional coupler can be used in transmit Cable A to derive the messaging and carrier frequency lock. It is contemplated that this can provide a larger signal at the expense of a directional coupler. In other words, it is contemplated that the use of the co-directionally coupled response for this purpose requires less equipment.

Figure 9:
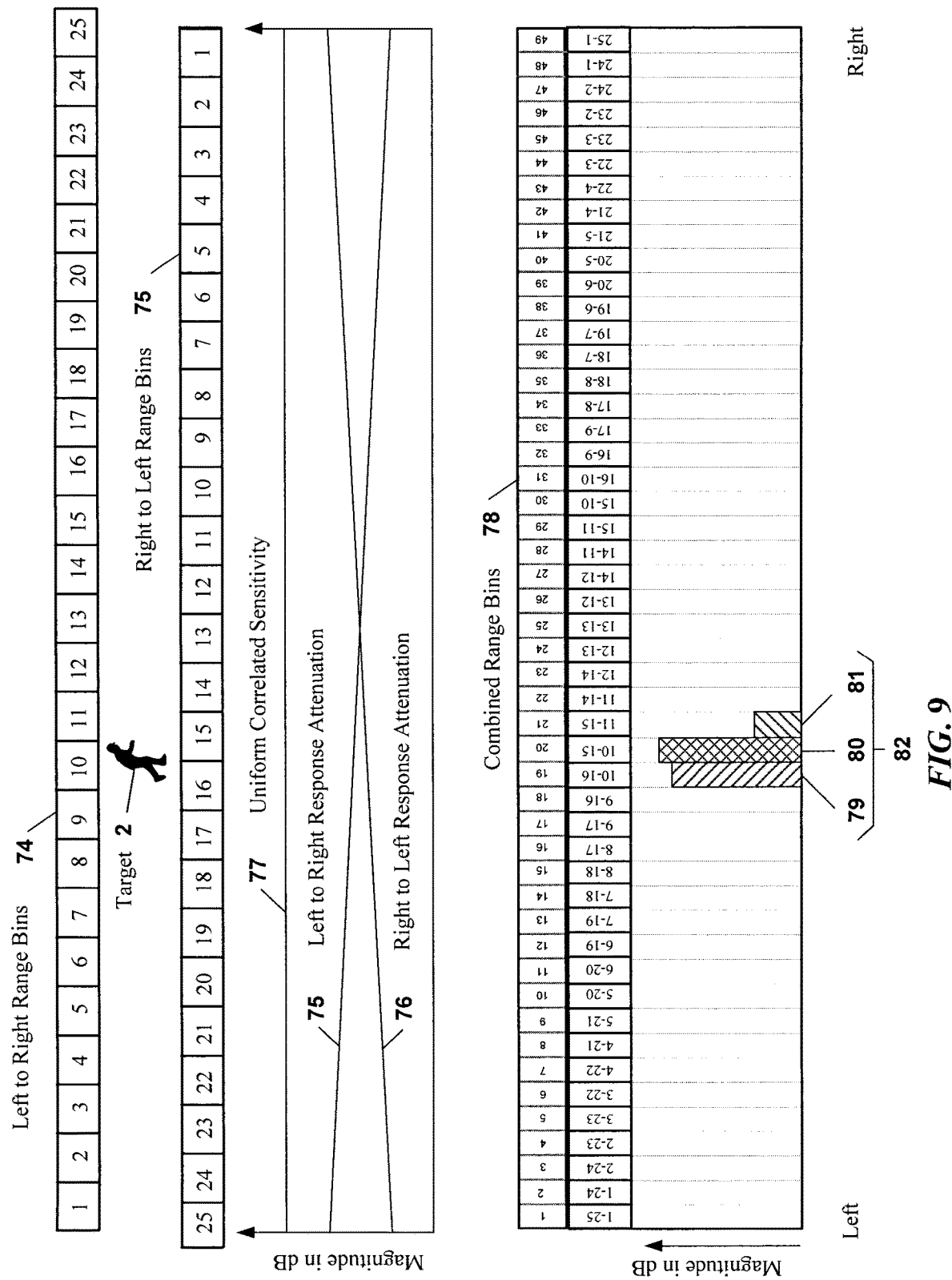
FIG. 9 illustrates at least one embodiment of the End-to-End correlation of the range bin data associated with the Wide-Band embodiment of the invention.

In this embodiment, BPSK messaging is used to send the 4 primary contra-directionally coupled variables defined in equations (5), (6), (7) and (8) for each of the 25 range bins from one processor to the next for each transmission to the left and to the right. These data are used at the receiving processor to implement the End-to-End correlation of the target response data as illustrated in FIG. 9.

The range bin incremental target responses from Cable B taken from Left to Right are labelled $vLB_{k,p}$ and the incremental target responses from Right to Left are labelled $vRB_{k,p}$ time sample k and range bin for range bins p=1,2 . . . 25. These variables are equivalent to those expressed in equations (5) and (7) but on a range bin by range bin basis as computed at the output of the periodic autocorrelation of the Cable B responses.

The range bin incremental target responses from Cable C taken from Left to Right are labelled $vLC_{k,p}$ and the incremental target responses from Right to Left are labelled $vRC_{k,p}$ with time sample k and range bin for range bins p=1,2 . . . 25. These variables are equivalent to those expressed in equations (6) and (8) but on a range bin by range bin basis as computed at the output of the periodic autocorrelation of the Cable C responses.

Measured in dB the incremental response from Left to Right 75 decays linearly with distance due to attenuation in the transmit and receive cables. Likewise incremental response from Right to Left 76 decays linearly with distance due to attenuation in the transmit and receive cables. Note that the incremental responses are complex numbers having both an in-phase and a quadrature-phase component. End-to-End correlation is determined by taking the product of the responses as seen from both ends as in equations (12), (13) and (14) for each of the twenty five range bins. In dB this is equivalent to taking the sum of the Left to Right Response 75 and the Right to Left Response 76 to provide a uniform magnitude along the length of sensor cable as in 77. This is the same as in the Narrow-Band embodiment but it is now done on a range bin by range bin basis.

As indicated in FIG. 9 the response sampling is so arranged as to have the range bins seen from the left interleave with those seen from the right so that the bin boundaries bisect each other. The End-to-End correlation for Cable B is performed by taking the product as follows:

$$vB_{k,i} = vLB_{k,INT[(i+1)/2]} vLR_{k,INT[26-(i+1)/2]}^{*} \ i=1,2 \ldots 49 \quad (22)$$

and the End-to-End correlation for Cable B is performed by taking the product as follows:

$$vC_{k,i} = vLC_{k,INT[(i+1)/2]} vRC_{k,INT[26-(i+1)/2]}^{*} \ i=1,2 \ldots 49 \quad (23)$$

where INT(x) is the nearest integer when x is rounded down and * means taking the complex conjugate of the complex number.

Equations (22) and (23) are equivalent to equations (12) and (13) but on a range bin by range bin basis. Likewise the Cable A response is derived from:

$$vA_{k,i} = vB_{k,i}, vC_{k,i} \; i=1,2 \ldots 49 \qquad (24)$$

which is equivalent to equation (14) but on a range bin by range bin basis.

Note that this creates the forty nine Combined Range Bins labelled as 78 in FIG. 9. Hence with a 200 nanosecond chip length the combined range bins are 12.9 meters long, however other arrangements are also contemplated as will be readily understood by the skilled person.

When the target moves from left to right along the cables the phase rotates through a complete cycle every λ/4 meters where λ is the wavelength at the carrier frequency considering the propagation velocity inside the cables is 86% that of free space.

A target will appear in the three consecutive combined range bins 82. The target is located in combined range bin 80 and the ratio of the response in combined range bins 79 and 81 can be used to pinpoint the target location in this embodiment to within a meter.

It is contemplated that the PN sequence approach of the Wide-Band embodiment of the invention can locate multiple simultaneous targets. In these embodiments, the ability to resolve between two simultaneous targets is typically 30 meters, however other resolutions are also contemplated. Two simultaneous targets closer that the target resolution will be seen as one target.

It is further contemplated that End-to-End correlation requires that the target be located at the same location along the length of the cables as seen from both ends of the cables. This can substantially reduce the number of nuisance alarms due to random effects. The proximity to metallic fences has been a common source of nuisance alarms with existing ported coaxial cable sensors. While an intermittent connection in the adjacent fence can cause a target response when seen from the left and when seen form the right but they are unlikely to appear in the same range bin hence it is unlikely to create an alarm.

The accuracy with which targets are located can largely be determined by the Signal to Noise Ratio (SNR) in the detection process. With a Wide-Band sensor more noise is allowed into the receiver than with a Narrow-Band sensor. On the other hand random noise will be distributed over all range bins. The random noise on the Left receiver will not be correlated with that in the Right receiver. To create a nuisance alarm in a particular location requires that there be a simultaneous peak in the two range bins that combine to produce a Combined Range Bin. This is less likely to happen with End-to-End correlation than with traditional ranging sensors.

As previously described the two primary co-directional responses seen from the left $ULB_{k,q}$ and $ULC_{k,q}$ (before clutter removal) and the two primary co-directional responses seen from the right $URB_{k,q}$ and $URC_{k,q}$ are used to synchronize the carrier frequencies and to decode the BPSK message sent from the processor on the left to the processor on the right and vice versa. The co-directional response is located in range bin q as determined by the delay time in the signal propagating from one processor to the next. While the incremental co-directional response does not include any location information it does provide valuable target magnitude information.

One potential shortcoming of contra-directional cable guided sensors can be referred to as the "Two Target Cancellation" effect. More specifically, consider the case of two simultaneous intruders carefully spaced apart by $$\left(\frac{2n+1}{4}\right)\lambda$$

where n is an integer and λ is the effective wavelength, taking into account the velocity of propagation in the cables. To someone skilled in the art it is apparent that two simultaneous intruders can substantially reduce their combined response using this information and potentially cross over the cables undetected. This is true along the entire length of the cables in the Narrow-Band embodiment and within the resolution range of the Wide-Band embodiment of the invention. In both the Narrow-Band and Wide-Band embodiment the incremental response can be compared to a calibrated threshold to determine if an Alarm is to be declared. The calibrated threshold is created by storing the response magnitude while doing a walk along the sensor cable and subtracting a detection margin to ensure that even the minimum size target is detected. In operation the target is first located and then compared to the calibrated threshold. The size of the co-directional response is compared to that of the contra-directional response to determine if target cancellation has occurred in which case the contra-directional threshold is lowered to ensure the detection and location of the multiple targets.

Figure 10:
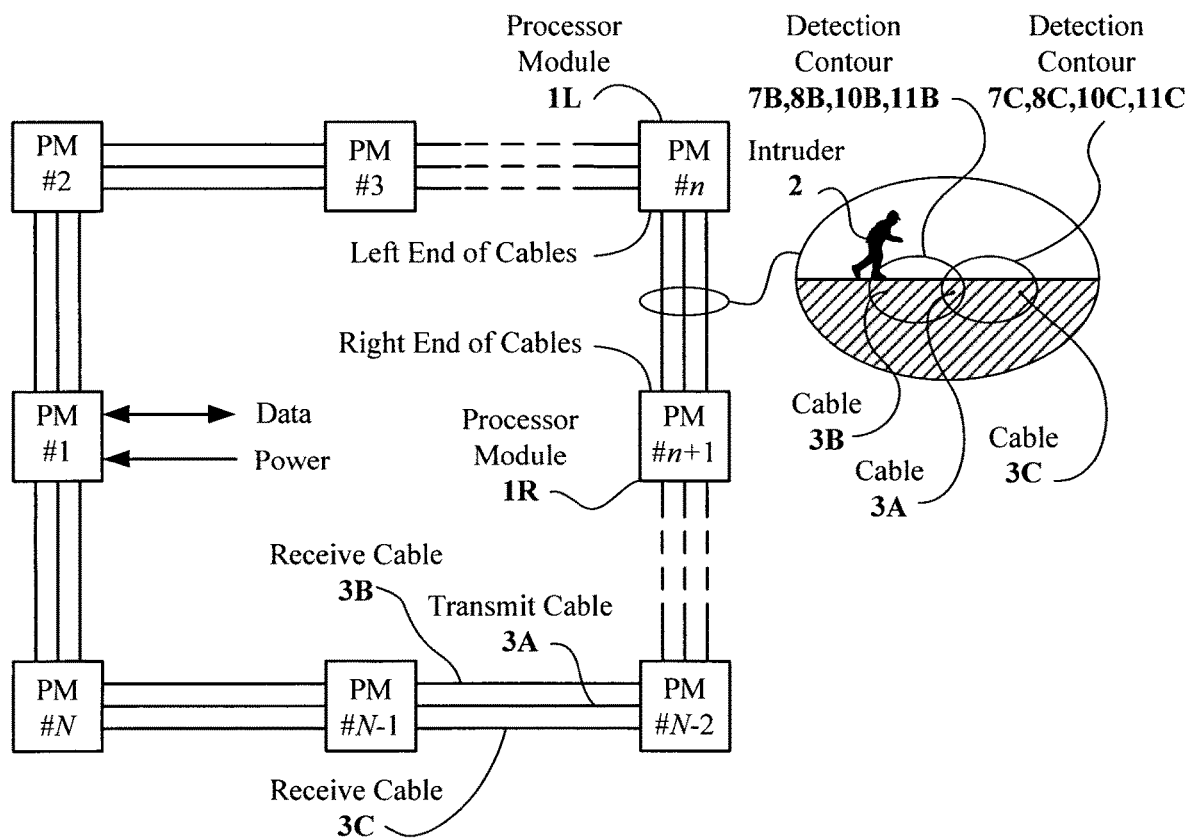
FIG. 10 illustrates how at least one embodiment of the MIMO leaky cable sensor can be adapted to protect long perimeters with the networking of multiple processors.

In order to address longer perimeters it is contemplated that one can network multiple processors together as illustrated in FIG. 10. Each Processor Module 1 has two Transceivers 1L and 1R. In a small "closed loop" perimeter Transceivers 1L and 1R are in the same processor with three lengths of sensor Cable 3A, 3B and 3C connecting the left and right hand ports. For longer closed loop perimeters such as illustrated in FIG. 7, multiple processors can be networked together to enclose the perimeter. In this case Transceiver 1L on one section of sensor cables is in processor #n+1 and Transceiver 1R on the same section of cable is in processor #n. In the networked application using the Narrow-Band embodiment it is contemplated that alternate processors can be set to use different modulation frequencies to avoid mutual interference among processors. In the networked application using the Wide-Band embodiment the synchronization of the carrier frequencies along with the use of the same sequence and different seeds to avoid mutual interference among the processors.

In a three cable system power can be supplied over the receive Cables 3B and 3C. Typically one uses dc power with the negative rail on the center conductor of one cable and the positive rail on the center conductor of the other cable, although other arrangements are also contemplated. The maximum voltage that can be used can be limited by building codes to 48 volts. In this way by using both positive and negative rail distribution it is contemplated that one can distribute four times the power that can be distributed on a two cable system. In addition this minimizes the current flowing in the outer conductors of the coaxial cables thereby minimizing the potential of ground loops, which are a known problem in two cable systems under certain ground conditions. Moreover, AC power could be distributed in a similar way like the split phase approach used in most house wiring in North America.

It is contemplated that the application of power over Cables 3B and 3C can be used to provide fail safe operation. Should either Cable 3B of 3C be severed, power can be provided to subsequent processors and the signal processing can revert from 3-cable to 2-cable operation. In a closed loop system, it is contemplated that power and data can be supplied from both ends of the loop to provide further fail safe benefits.

In summary, the End-to-End correlation of data from both ends of the cables can provide uniform sensitivity along the length of the cables thereby eliminating the use of costly graded leaky coaxial cables. The End-to-End correlation also can minimize the multipath noise due to fences and other sources. The MIMO nature of the sensor also can provide eight times the response data of the simple two cable sensors on the market today. The multiple images of the target can greatly enhance the signal to noise ratio which in turn reduces the false alarm rate. The combination of contra-directionally coupled and co-directionally coupled responses overcomes the two target cancellation vulnerability associated with all leaky cable sensors that are based solely on contra-directional coupling.

The present invention has been described in terms of both Narrow-Band and Wide-Band embodiments. The implementation of the Narrow-Band system is slightly simpler than that of the Wide-Band system. By operating inside the ISM band at 40.68 MHz the Narrow-Band system is less prone to RF interference but it cannot locate more than two simultaneous targets. It also contemplates the use of frequency multiplexing to communicate data from one processor to the next. The Wide-Band embodiment includes communication between processors by the encoding of the pseudo noise transmit signal thereby eliminating the need for frequency multiplexing. It also detects and locates multiple simultaneous targets. The End-to-End correlation of responses from both ends of the cables reduces the number of nuisance and false alarms.

It is contemplated that the MIMO cable guided radar described herein is largely Software Defined. Just as Software Defined Radio (SDR) has revolutionized communications, the ability to control both the carrier and modulation frequencies using software can provide at least one embodiment of the present invention with unprecedented flexibility to avoid jamming and thereby enhancing performance. The MIMO SDR ICs like the Lime Microsystems LMS7002m facilitate a compact, low power and low cost sensor providing unprecedented reduction in nuisance and false alarms. This can be important when addressing the very long perimeters associated with airports, pipelines and borders. The same hardware can be used for either the Narrow-Band or Wide-Band embodiment by changing software.

At least one embodiment of the Wide-Band signal processing has been described in terms of a PN sequence generated by a 17 stage LFSR. To one skilled in the art it should be apparent that one could use a $2^m-1$ length PN generated by an m stage shift register for different values of m, among other arrangements depending on the needs of the specific end user application of the present invention.

At least one embodiment of the Wide-Band signal processing has been described in terms of a sensor operating at 32 MHz. The frequency agility built into an SDR IC like the LMS7002m makes it relatively easy to change the carrier frequency. In North America other frequencies are also used by leaky coaxial cable sensors such as 25 MHz and 50 to 60 MHz. The frequency agility of the SDR approach allows one to adapt to different country regulations. In addition it can be used to avoid RF interference in some situations.

It is contemplated that there are applications where cost is a major driving factor and target classification is not important. In such embodiments, it is contemplated that the skilled person could employ a two cable (Cable A and Cable B) embodiment of the present invention. In these embodiments, it is contemplated that End-to-End correlation can provide significant benefits over other two cable sensor arrangements that are known in the prior art.

It should be apparent to one skilled in the art that one could achieve target classification using two cables as opposed to three by placing directional couplers in transmit Cable A and using the responses derived therefrom to provide the Cable C response cited in this invention. In these embodiments, the detection zone can be smaller and the SNR can be reduced however it is contemplated that these embodiments only require two cables as opposed to three.

While the present invention has been described with reference to the aforementioned embodiments it will be apparent to anyone skilled in the art that there are many permutations and combinations of combining the primary response variables to achieve particular benefits. All such permutations and combinations are considered to be within the sphere and scope of this invention as defined in the claims appended hereto.

I claim:

1. A multiple-input, multiple-output (MIMO) security apparatus comprising a processor, wherein the processor comprises:
   a transmitter configured to emit a first signal into a first coaxial cable in time-multiplexed relation to another signal emitted into the first coaxial cable by another device;
   a first receiver configured to receive a second signal from a second coaxial cable;
   a second receiver configured to receive a third signal from the second coaxial cable; and
   circuitry configured to assess a first measure of correlation between the first signal and the second signal, to assess a second measure of correlation between the second signal and the other signal emitted into the first coaxial cable by the other device, to assess a third measure of correlation between the first signal and the third signal, to assess a fourth measure of correlation between the third signal and the other signal emitted into the first coaxial cable by the other device, and to determine a presence of a target positioned adjacent the first coaxial cable, the second coaxial cable, or both, based, at least in part on, the first measure of correlation, the second measure of correlation, the third measure of correlation, and the fourth measure of correlation.

2. The MIMO security apparatus according to claim 1, wherein the circuitry is further configured to decode communication data contained in the other signal, wherein the communication data is associated with the other transmitter.

3. The MIMO security apparatus according to claim 1, wherein the transmitter is a first transmitter, wherein the processor further comprises a second transmitter, and wherein the other device is the second transmitter.

4. The MIMO security apparatus according to claim 1, wherein the correlation between the first signal and the second signal corresponds to a contra-directionally coupled signal response in the second coaxial cable induced by the first signal in the first coaxial cable, and wherein the correlation between the second signal and the other signal emitted into the first coaxial cable by the other transmitter corresponds to a co-directionally coupled signal response in the second coaxial cable induced by the other signal in the first coaxial cable.

5. The MIMO security apparatus according to claim 1, wherein the circuitry is further configured to declare an event responsive to a determined presence of a target.

6. The MIMO security apparatus according to claim 1, wherein the circuitry is further configured to estimate a size of a target in correspondence with one or both of the first measure of correlation and the second measure of correlation.

7. The MIMO security apparatus according to claim 1, wherein the circuitry is further configured to estimate a position of a target in correspondence with the first measure of correlation.

8. The MIMO security apparatus according to claim 1, wherein the second receiver is configured to receive a fourth signal from a third coaxial cable, wherein the circuitry is configured to determine at least one of a position, a direction, or a speed of a target positioned adjacent any of the first coaxial cable, the second coaxial cable, or the third coaxial cable, based, at least in part on, the first measure of correlation and the third measure of correlation.

9. The MIMO security apparatus according to claim 1, wherein the circuitry is configured to determine the presence of the target when the first measure of correlation exceeds a calibrated threshold.

10. The MIMO security apparatus according to claim 1, wherein a frequency of the first signal is between 25 MHz and 70 MHz.

11. The MIMO security apparatus according to claim 1, wherein the circuitry is configured to compare a magnitude of the first measure of correlation and a magnitude of the second measure of correlation, and determine a presence of a plurality of targets when the magnitude of the second measure of correlation is greater than the magnitude of the first measure of correlation.

12. The MIMO security apparatus according to claim 11, wherein the magnitude of the first measure of correlation is indicative of a cancelled signal from two targets, and the magnitude of the second measure of correlation is indicative of an additive signal from two targets.

13. The MIMO security apparatus according to claim 1, wherein the transmitter is configured to emit the first signal as a modulated signal using one of wide-band modulation or narrow-band modulation.

14. The MIMO security apparatus according to claim 1, wherein the first signal is double sideband suppressed carrier transmission or a PN coded transmission.

15. The MIMO security apparatus according to claim 1, further comprising:
the first coaxial cable defining a corresponding first longitudinal axis; and
the second coaxial cable defining a corresponding second longitudinal axis;
wherein each coaxial cable extends from a respective first end to a respective second end and has a respective inner conductor and a respective outer conductor, wherein each respective outer conductor defines an arrangement of one or more longitudinally extending apertures.

16. The MIMO security apparatus according to claim 15, wherein the arrangement of one or more longitudinally extending apertures defined by the first coaxial cable is configured such that an electromagnetic field propagates externally of the first coaxial cable in a longitudinal direction and in correspondence with the first signal transmitted on the corresponding inner conductor of the first coaxial cable, wherein the arrangement of one or more longitudinally extending apertures defined by the second coaxial cable is configured such that a longitudinally propagating electromagnetic field external to the second coaxial cable induces a current in the inner conductor of the second coaxial cable.

17. The MIMO security apparatus according to claim 16, wherein the transmitter is a first transmitter, wherein the processor further comprises a second transmitter coupled to the second end of the first coaxial cable, the other device being the second transmitter configured to emit the other signal to the second end of the first coaxial cable, wherein the first measure of correlation between the first signal and the second signal corresponds to a first contra-directionally coupled signal corresponding to the first signal emitted by the first transmitter, wherein the fourth measure of correlation between the third signal and the other signal corresponds to a second contra-directionally coupled signal corresponding to the other signal emitted by the second transmitter, and wherein the processor is further configured to combine the first contra-directionally coupled signal and the second contra-directionally coupled signal with each other, defining a sensitive detection zone spanning longitudinally of the first coaxial cable and the second coaxial cable.

18. The MIMO security apparatus according to claim 15, wherein the first measure of correlation between the first signal and the second signal corresponds to a first contra-directionally coupled signal corresponding to the first signal emitted by the transmitter, wherein the fourth measure of correlation between the third signal and the other signal corresponds to a second contra-directionally coupled signal corresponding to the other signal emitted by the other device, wherein the processor is further configured to combine the first and second contra-directionally coupled signals to derive a measure of the cross section of the target.

19. The MIMO security apparatus according to claim 1, wherein the transmitter and the first receiver comprise a first transceiver module coupled to a first end of the coaxial cables, and wherein the other device and the second receiver comprise a second transceiver module coupled to a second end of the coaxial cables.

20. The MIMO security apparatus according to claim 19, wherein the second transceiver module is separated from the first transceiver module.

21. The MIMO security apparatus according to claim 19, wherein the first transceiver module is physically connected to the second transceiver module.

* * * * *